US012776543B1

(12) United States Patent
Paganini De Mio et al.

(10) Patent No.: US 12,776,543 B1
(45) Date of Patent: Oct. 27, 2026

(54) BATTERY SUPPORT WITH INTEGRATED SPRING

(71) Applicant: Tractian Technologies Inc, Atlanta, GA (US)

(72) Inventors: Pedro Paganini De Mio, São Paulo (BR); Giovani Hidalgo Ceotto, São Paulo (BR); Vinicius Martim, São Paulo (BR)

(73) Assignee: Tractian Technologies Inc, Atlanta, GA (US)

( * ) Notice: Subject to any disclaimer, the term of this patent is extended or adjusted under 35 U.S.C. 154(b) by 0 days.

(21) Appl. No.: 19/392,038

(22) Filed: Nov. 17, 2025

(51) Int. Cl.
*H01M 50/244* (2021.01)
*H01M 50/202* (2021.01)
*H01M 50/227* (2021.01)
*H01M 50/251* (2021.01)
*H01M 50/284* (2021.01)

(52) U.S. Cl.
CPC ....... *H01M 50/244* (2021.01); *H01M 50/202* (2021.01); *H01M 50/227* (2021.01); *H01M 50/251* (2021.01); *H01M 50/284* (2021.01); *H01M 2220/10* (2013.01)

(58) Field of Classification Search
CPC ............. H01M 50/244; H01M 50/202; H01M 50/227; H01M 50/251; H01M 50/284; H01M 2220/10; Y10T 24/142; Y10T 24/45089; Y10T 24/45099; Y10T 24/45241; Y10T 24/45597; Y10T 24/45251; Y10T 24/49
See application file for complete search history.

(56) References Cited

U.S. PATENT DOCUMENTS 6,000,104 A * 12/1999 Mann ...................... F16L 33/02 24/271
6,376,126 B1 * 4/2002 Faust .................. H01M 50/121 429/66
2009/0123818 A1 * 5/2009 Huang ................ H01M 50/213 429/98
2013/0316201 A1 * 11/2013 Tanaka .............. H01M 10/0413 429/56
2014/0272544 A1 * 9/2014 Bruch .................. H01M 50/24 429/163
2018/0053922 A1 * 2/2018 Van Roon ........... H01M 50/271
(Continued)

*Primary Examiner* — Maria Laios
*Assistant Examiner* — Ziheng Lu
(74) *Attorney, Agent, or Firm* — Cognition IP, P.C.; Edward Steakley; Justin White

(57) ABSTRACT

A battery support that holds a battery within a vibration sensor or other electronic device includes a bottom portion, wall(s), top opening, and integrated spring element. The wall(s) couple to and extend away from the bottom portion to define an inner space that holds the battery. The top opening is located opposite the bottom portion and facilitates insertion and removal of the battery into and from the inner space. The integrated spring element is formed vertically along a wall, deforms when a battery is inserted, and provides a lateral force against the battery that holds the battery in place. The integrated spring element includes a graduated protrusion that contacts and is pushed outward by the battery and vertically oriented openings through the wall along left and right sides of the graduated protrusion that facilitate greater deformation flexibility of the integrated spring element.

21 Claims, 19 Drawing Sheets

(56) References Cited

U.S. PATENT DOCUMENTS

| | | | | |
|---|---|---|---|---|
| 2019/0020004 | A1* | 1/2019 | Choi | H01M 50/242 |
| 2019/0360611 | A1* | 11/2019 | Poe | F16L 1/20 |
| 2020/0212549 | A1* | 7/2020 | Gibson | H01Q 21/0006 |
| 2022/0294066 | A1* | 9/2022 | Frazier | H01M 50/267 |
| 2023/0058417 | A1* | 2/2023 | Whitmore | H01M 50/244 |
| 2023/0083294 | A1* | 3/2023 | Snyder | B61L 25/026<br>701/19 |

* cited by examiner

BATTERY SUPPORT WITH INTEGRATED SPRING

TECHNICAL FIELD

The present disclosure relates generally to electronic devices, and more particularly to improved battery arrangements for electronic devices.

BACKGROUND

Industrial machinery typically involves the implementation of sensors to monitor aspects and performance of machine operations. These can include, for example, vibration sensors that can withstand constant significant vibrations while performing at a reliable level for many years to monitor and communicate machine vibration levels. Vibration sensors and other electronic devices and industrial equipment often use durable parts as well as vibration damping components to be effective. Vibration sensors and other electronic devices often include, for example, internal batteries with supporting structures that adequately dampen vibrations such that the batteries provide a constant source of power to internal sensor electronics so that the sensors can automatically monitor and communicate vibrations over extended periods of time.

Unfortunately, support arrangements for internal batteries often use multiple parts to account for battery support, constant connectivity, vibration damping, and other environmental factors that can affect long term reliability and battery life. Each of these multiple parts can reflect separate modes of failure for fatigue, creep, and other factors. Further, these traditional multiple part approaches can complicate battery removal and replacement within the device.

Although traditional battery supports within electronic devices have worked well in the past, improvements are always helpful. In particular, what is desired are improved internal structures for electronic devices that permit easy battery replacement and extend battery life.

SUMMARY

It is an advantage of the present disclosure to provide improved internal structures for vibration sensors and other electronic devices that permit easy battery replacement and extend battery life. The disclosed features, apparatuses, systems, and methods relate to battery supports within electronic devices, which can include mechanical arrangements that support a removable battery while being able to withstand significant vibrations and other environmental problems while still enabling good battery performance and long battery life. In particular, the disclosed embodiments can involve the use of battery supports having integrated spring components that can hold a removable battery in place within an electronic device while absorbing or mitigating the effects of significant vibrations over extended periods of time.

In various embodiments of the present disclosure, a battery support configured to hold a separate battery within a separate electronic device can include a bottom portion, one or more walls, a top opening, and an integrated spring element. The bottom portion can be configured to contact a separate battery when the separate battery is installed within the battery support. The one or more walls can be coupled to and extending away from the bottom portion, and the bottom portion and the one or more walls can define an inner space configured to hold at least a portion of the separate battery therein, The top opening can be located along a top of the one or more walls opposite the bottom portion, and the top opening can be configured to facilitate insertion and removal of the separate battery into and from the inner space. The integrated spring element can be formed along a first side of the one or more walls, and this integrated spring element can be configured to deform and to provide a lateral force against a side of the separate battery when the separate battery is installed within the battery support. The lateral force can be sufficient to hold the separate battery in place within the battery support.

In various detailed embodiments, the separate electronic device can be a vibration sensor configured to monitor vibrations of a separate mechanical asset. The one or more walls can form a continuous outer circumference around the battery support between the bottom portion and the top opening. The bottom portion, the one or more walls, and the integrated spring element can all be integrally formed from a polyether ether ketone material. In some arrangements, integrated spring element can be arranged vertically along the first side of the one or more walls. The integrated spring element can include a graduated protrusion along an inner surface of the first side that extends into the inner space, and this graduated protrusion can be configured to contact an outer surface of the separate battery and to deform by being pushed outward when the separate battery is inserted into the inner space. The integrated spring element can further include vertically oriented openings through the first side of the one or more walls along left and right sides of the graduated protrusion, and these vertically oriented openings can be configured to facilitate greater deformation flexibility of the integrated spring element.

In further detailed embodiments, the battery support can further include a plurality of ribs located opposite the integrated spring element, and this plurality of ribs can be configured to provide opposing points of contact and forces against the separate battery when the integrated spring element provides a lateral force against the separate battery. The plurality of ribs can be vertically oriented and can be formed in other sides of the one or more walls opposite the first side. The battery support can further include a printed circuit board coupling arrangement formed along a second side of the one or more walls separate from the first side. This printed circuit board coupling arrangement can be configured to facilitate coupling a separate printed circuit board for the separate electronic device to the battery support. In some arrangements, the bottom portion can include a plurality of coupling features configured to couple the battery support to a separate outer housing of the separate electronic device while the battery support is located within the separate outer housing. Also, the battery support can be configured to hold the separate battery in place within the battery support for a period of at least 5 years and while mechanical vibrations of over 60 G are consistently experienced by the battery support.

In further embodiments of the present disclosure, an electronic device can include an outer housing, a replaceable battery, a plurality of electronic components, and a battery support. The outer housing can define an internal volume, and the replaceable battery can be located within the internal volume of the outer housing. The plurality of electronic components can also be located within the internal volume of the outer housing and can be coupled to and powered by the replaceable battery. The battery support can also be located within the outer housing and can hold the replaceable battery. The battery support can include a bottom portion, one or more walls, a top opening, and an integrated spring element formed along a first side of the one or more walls. The integrated spring element can be configured to deform and to provide a lateral force against a side of the replaceable battery when the replaceable battery is installed within the battery support. The lateral force can be sufficient to hold the replaceable battery in place within the battery support.

In various detailed embodiments, the electronic device can be a vibration sensor configured to monitor vibrations of a separate mechanical asset. Such a vibration sensor can include an accelerometer located between the bottom portion of the battery support and a bottom of the outer housing along a central longitudinal axis of the vibration sensor. The outer housing can include an outer cover removably coupled to a base. In some arrangements, the integrated spring element can be arranged vertically along the first side of the one or more walls. The integrated spring element can include a graduated protrusion along an inner surface of the first side that contacts and is pushed outward by an outer surface of the replaceable battery, and can also include vertically oriented openings through the first side along left and right sides of the graduated protrusion with the vertically oriented openings being configured to facilitate greater deformation flexibility of the graduated spring element.

In still further embodiments of the present disclosure, various methods of using a battery within an electronic device are provided. Pertinent process steps can include installing a battery support to a base of the electronic device, inserting a battery, holding the battery in place, and coupling an outer cover to the base. The battery support can include a bottom portion, one or more walls, a top opening, and an integrated spring element formed along a first side of the one or more walls. The battery can be inserted through the top opening of the battery support, and inserting the battery can include bringing an outer surface of the battery into contact with an inner surface of the integrated spring element. The battery can be held in place within the battery support, and holding the battery can be facilitated at least in part by way of a lateral force exerted on the battery by the integrated spring element. The outer cover and the base can combine to form an outer housing that contains the battery and battery support therein.

In various detailed embodiments, the electronic device can be a vibration sensor. Further process steps can include coupling the battery electrically to a plurality of electronic components located within the outer housing, wherein the plurality of electronic components include an accelerometer, powering the plurality of electronic components with the battery, removing the outer cover from the base, removing the battery from the battery support, inserting a replacement battery through the top opening of the battery support, and recoupling the outer cover to the base.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures, arrangements, devices, systems, and methods of use for battery supports with integrated springs, as well as vibration sensors and other electronic devices that use such battery supports with integrated springs. These drawings in no way limit any changes in form and detail that may be made to the disclosure by one skilled in the art without departing from the spirit and scope of the disclosure.

DETAILED DESCRIPTION

Figure 1A:
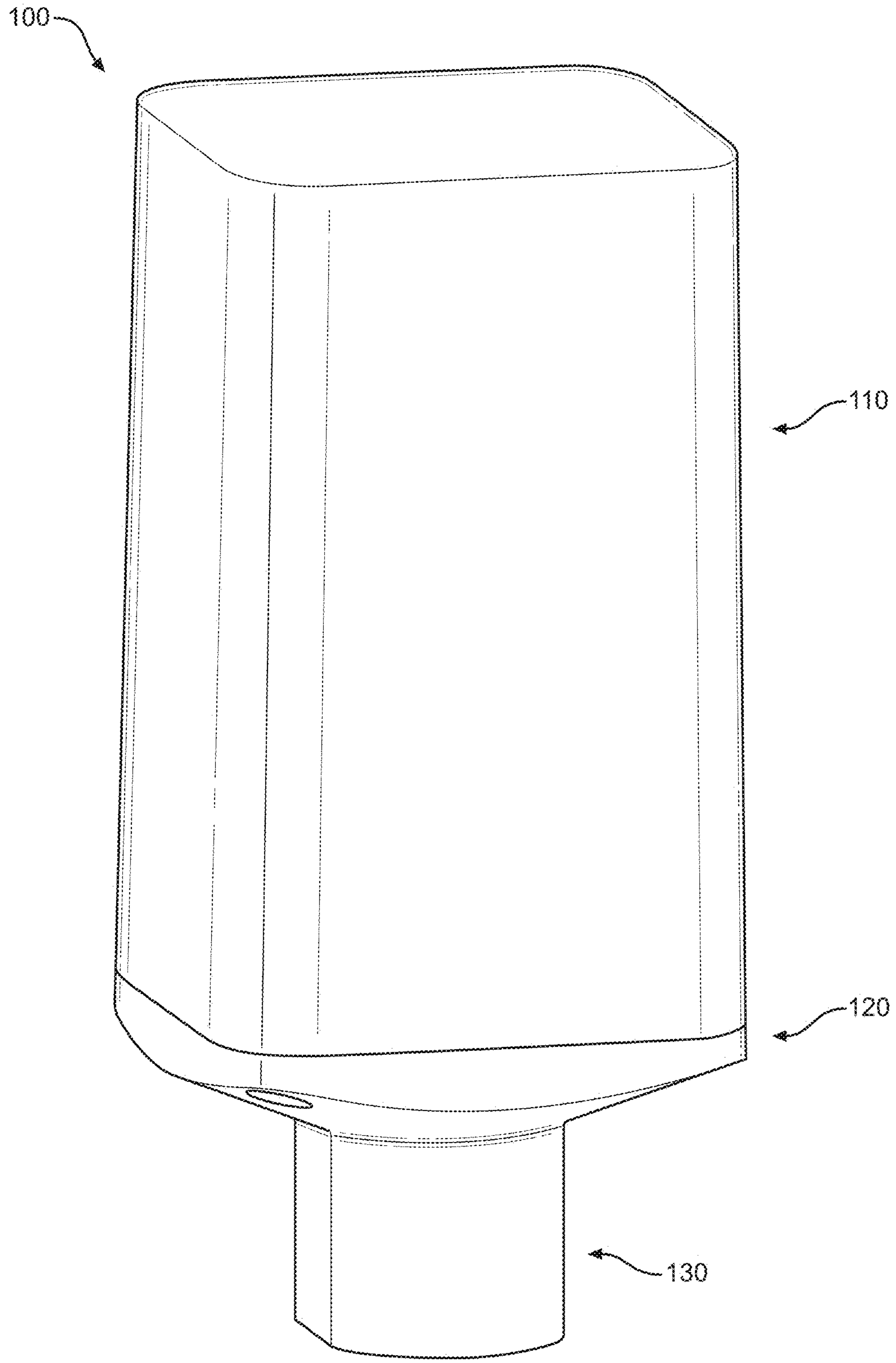
FIG. 1A illustrates in front perspective view an electronic device according to one embodiment of the present disclosure.

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to features, apparatuses, systems, and methods involving battery supports for use in electronic devices. The disclosed embodiments provide improved internal structures for electronic devices that permit easy battery replacement and extend battery life in challenging environments and applications while holding all electronic components within a compact space. In particular, the disclosed embodiments can involve the use of battery supports having integrated spring components that can hold a removable battery in place within an electronic device while absorbing or mitigating the effects of significant vibrations over extended periods of time. This can be particularly useful for vibration sensors and other electronic devices subject to vibrations or other hostile conditions.

Although various embodiments disclosed herein discuss specific applications of a vibration sensor, it will be readily appreciated that the disclosed features, apparatuses, systems, and methods of use for battery supports with integrated spring elements can also be used in other electronic devices and applications where holding a battery in place is desired. Similarly, while specific applications involving specialized replaceable batteries are disclosed, it will be readily appreciated that standard and/or non-replaceable batteries may alternatively be used with the disclosed battery supports and electronic devices. Furthermore, while some examples are provided for specific features, components, and materials, it will be understood that these can be replaced with any suitable substitute or alternative features, components, and/or materials that take advantage of the disclosed features. Other applications, arrangements, and extrapolations beyond the illustrated embodiments are also contemplated.

Referring first to FIG. 1A, an electronic device is illustrated in front perspective view. Electronic device 100 can be, for example, a vibration sensor, although other types of sensors or other electronic devices are also possible. Shown as fully assembled, electronic device 100 can include an outer cover 110, a base 120, and a coupling component 130. Outer cover 110 can be removably coupled to base 120 to form an outer housing for electronic device 100. Such an outer housing can define an internal volume that contains various internal components therein, such as a plurality of electronic components, a battery, and a battery support, among other items and features, as set forth in greater detail below.

Coupling component 130 can be an optional item configured to couple electronic device 100 to a separate device. Where electronic device 100 is a vibration sensor, for example, coupling component 130 can be a mounting assembly configured to mount the vibration sensor to an industrial motor or other mechanical asset to monitor for vibrations. In some arrangements, coupling component 130 can be considered a separate item that can be removably coupled to electronic device 100 and a separate device. Electronic device 100 can have a threaded post extending outward from its bottom, for example, which can be a standard feature on a typical vibration sensor. Coupling component 130 can have a threaded inner opening configured to receive this threaded portion, and can also have one or more other features to facilitate mounting electronic device 100 to a separate item, as will be readily understood by those of skill in the art.

Figure 1B:
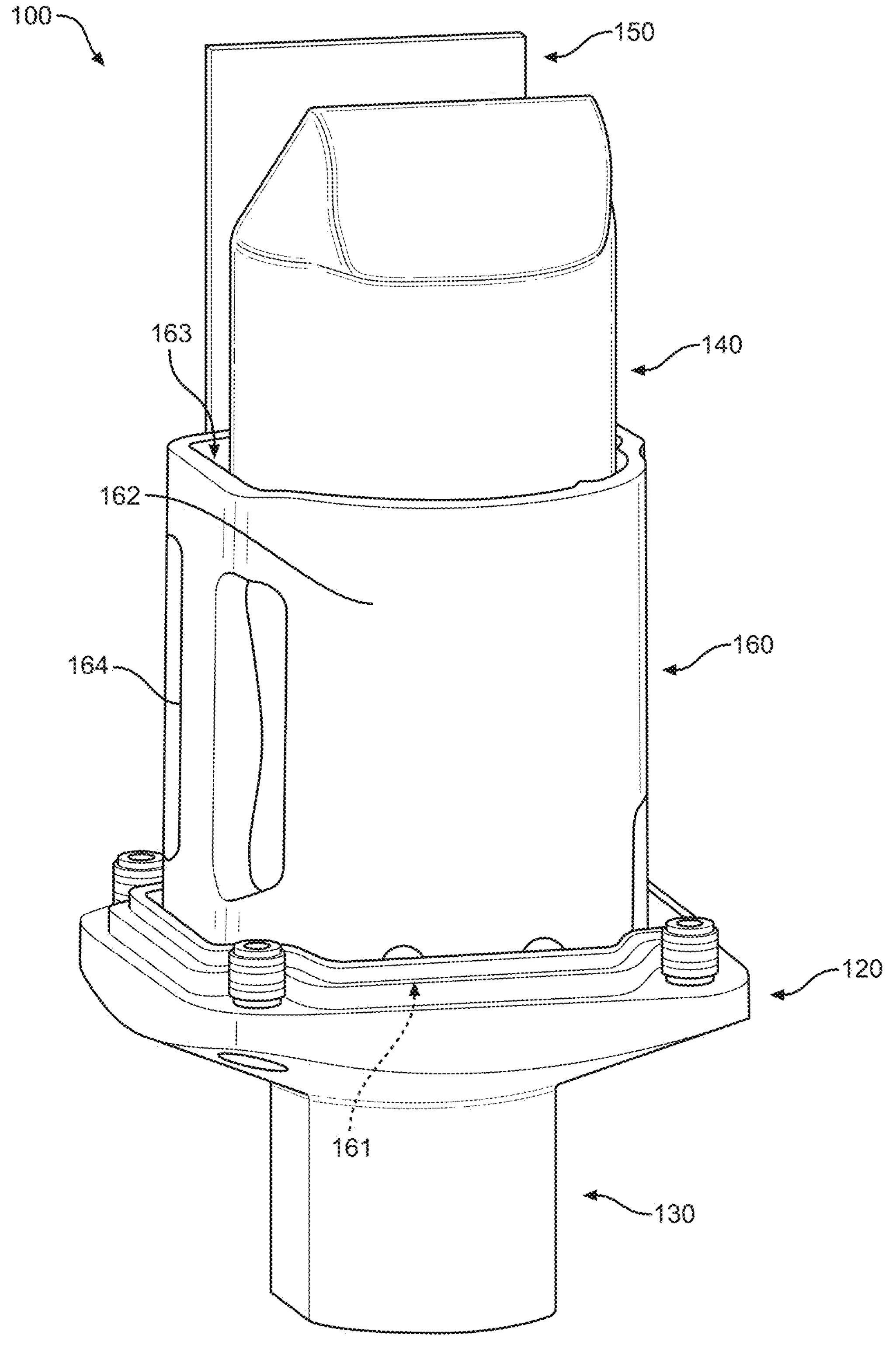
FIG. 1B illustrates in front perspective view the electronic device of FIG. 1A with its outer cover removed according to one embodiment of the present disclosure.
Figure 1C:
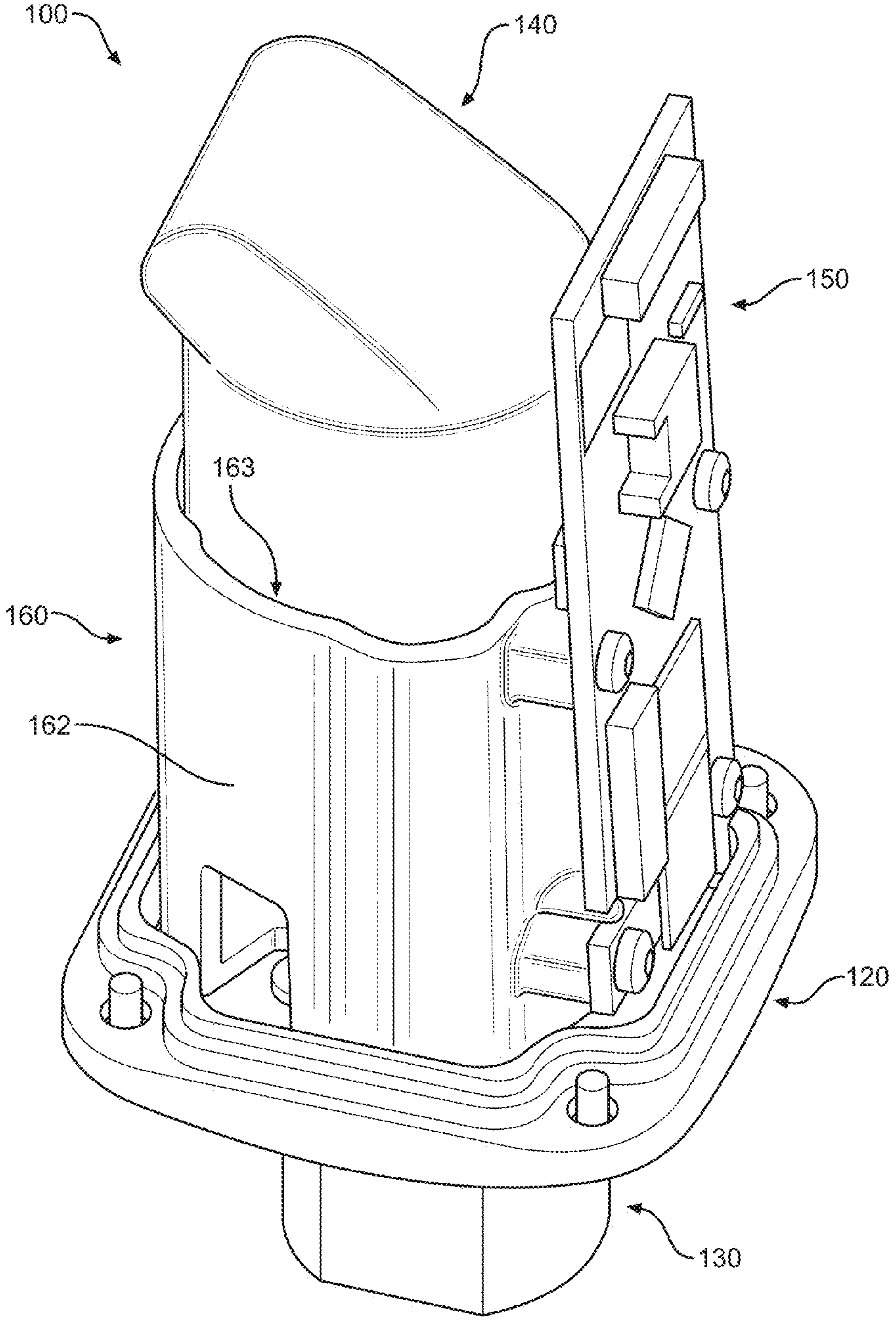
FIG. 1C illustrates in top side perspective view the electronic device of FIG. 1B with its outer cover removed according to one embodiment of the present disclosure.

Continuing with FIGS. 1B and 1C, electronic device 100 is shown in front perspective and top side perspective views respectively with its outer cover 110 removed. Again, electronic device 100 can include a base 120 and optional coupling component 130 coupled to the bottom of the base. Internal components located beneath the removed top cover (i.e., within the internal volume of the outer housing) can include a removable battery 140, a printed circuit board 150, and a battery support 160, among other possible internal components. As shown, battery 140 can be inserted through a top opening of battery support 160 such that when it is fully installed a portion of the battery is held within the battery support while another portion of the battery protrudes from the top and is outside of the battery support. In some arrangements, battery 140 can be a customized battery designed for specific use with electronic device 100. As such, battery 140 can be designed to supply power for the specific electronic components within electronic device 100 and can have a handle or otherwise grippable shape at its top such that the battery can be readily inserted into and removed from battery support 160. Battery 140 can be a separate item that is commercially available or customized with set outer dimensions and made by a third party. As a non-limiting example, battery 140 can be any suitable D-size battery, such as the model TLH5920 battery made by Tadiran Batteries of Lake Success, New York. Of course, other makers and sizes of batteries are also possible.

Printed circuit board 150 can include various electronic components distributed thereupon, which can be electrically coupled to and powered by battery 140. Printed circuit board 150 can be arranged vertically and can be coupled to a side of battery support 160, such as by using multiple screws and/or other suitable coupling items or features, and can be arranged such that the printed circuit board and its electronic components do not contact the outer cover when the outer cover is installed onto base 120. Battery support 160 can thus be specifically designed such that it supports both removable battery 140 and printed circuit board 150. In some arrangements electronic device 100 can include a plurality of electronic components, with some of those electronic components being located on printed circuit board 150 while others of those electronic components being located on base 120 beneath a bottom of battery support 150.

Battery support 160 can be coupled to base 120, such as by using multiple screws and/or other suitable coupling items or features through a bottom portion of the battery support and into the base. Battery support 160 can include a bottom portion 161, one or more walls 162, a top opening 163, and an integrated spring element 164 formed along a first side of the one or more walls, among other features and details. Bottom portion 161 and one or more walls 162 can combine to define an inner space configured to hold at least a portion of battery 140 therein, as shown. Integrated spring element 164 (i.e., an integrated spring, battery support spring, or simply a "spring") can be integrally formed in a wall 162 and can be configured to deform and provide a lateral force against a side of battery 140 when the battery is installed within battery support 160, as shown in FIG. 1B. This lateral force can be sufficient to hold battery 140 in place within battery support 160 despite the battery being removable and a portion of the battery protruding through top opening 163, as set forth in greater detail below.

Figure 1D:
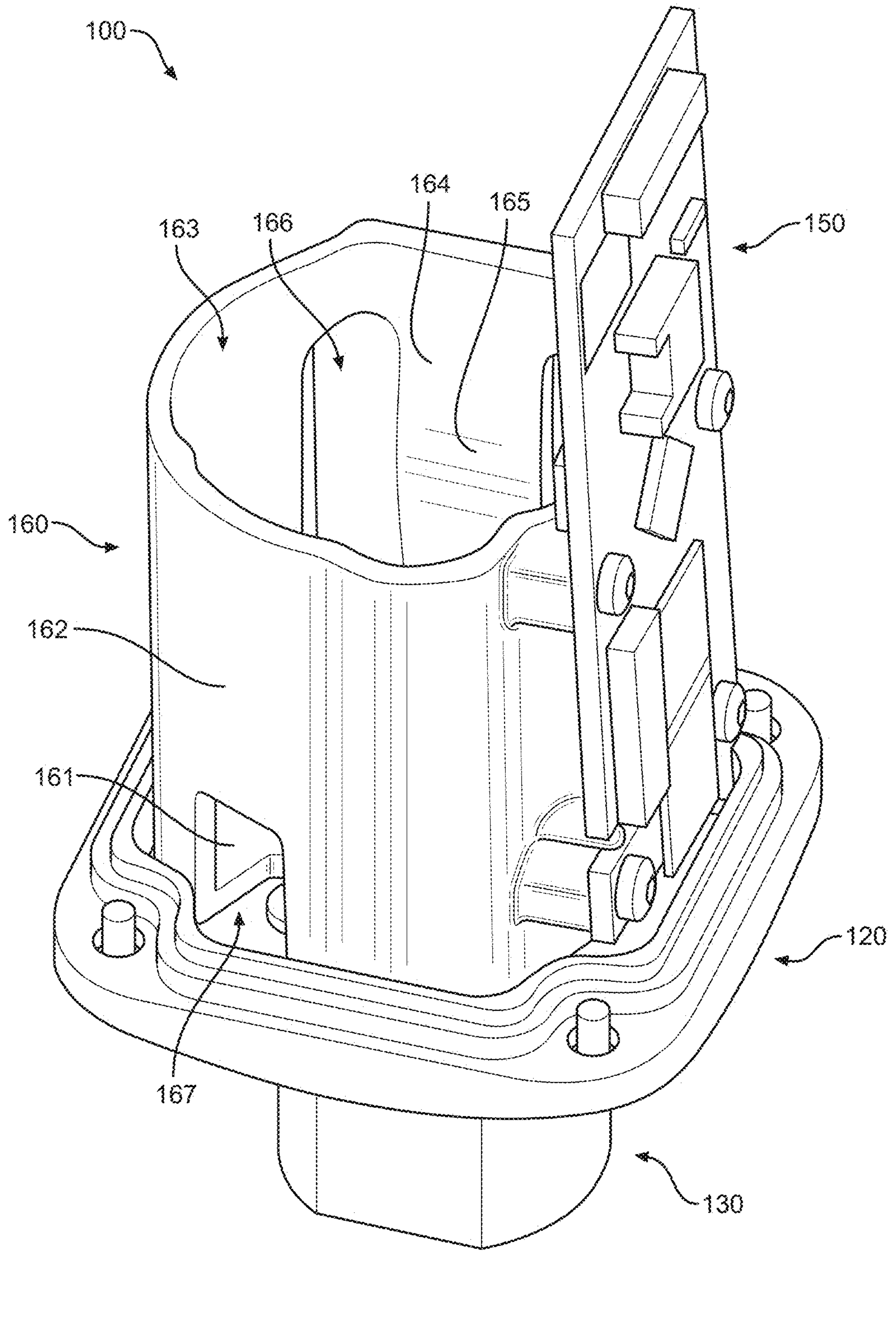
FIG. 1D illustrates in top side perspective view the electronic device of FIG. 1C with its outer cover and battery removed according to one embodiment of the present disclosure.

FIG. 1D illustrates electronic device 100 with its outer cover 110 and battery 140 removed in the same top side perspective view shown in FIG. 1C. As shown without the battery present, battery support 160 can have one or more walls 162 that form a continuous outer circumference around the battery support between bottom portion 161 and top opening 163. This can be considered a single continuous sidewall in some arrangements. Integrated spring element 164 can be formed in a first side of continuous wall 162 and printed circuit board 150 can be coupled to a second side of the wall. Integrated spring element 164 can be arranged vertically and can include a graduated protrusion 165 and vertically oriented openings 166 along left and right sides of the graduated protrusion. An ejection opening 167 configured to facilitate battery removal can be formed along a bottom of wall 162 in some arrangements, and some of bottom portion 161 can be seen through this ejection opening. Other features and functionalities of battery support 160 are provided in greater detail below.

Figure 2:
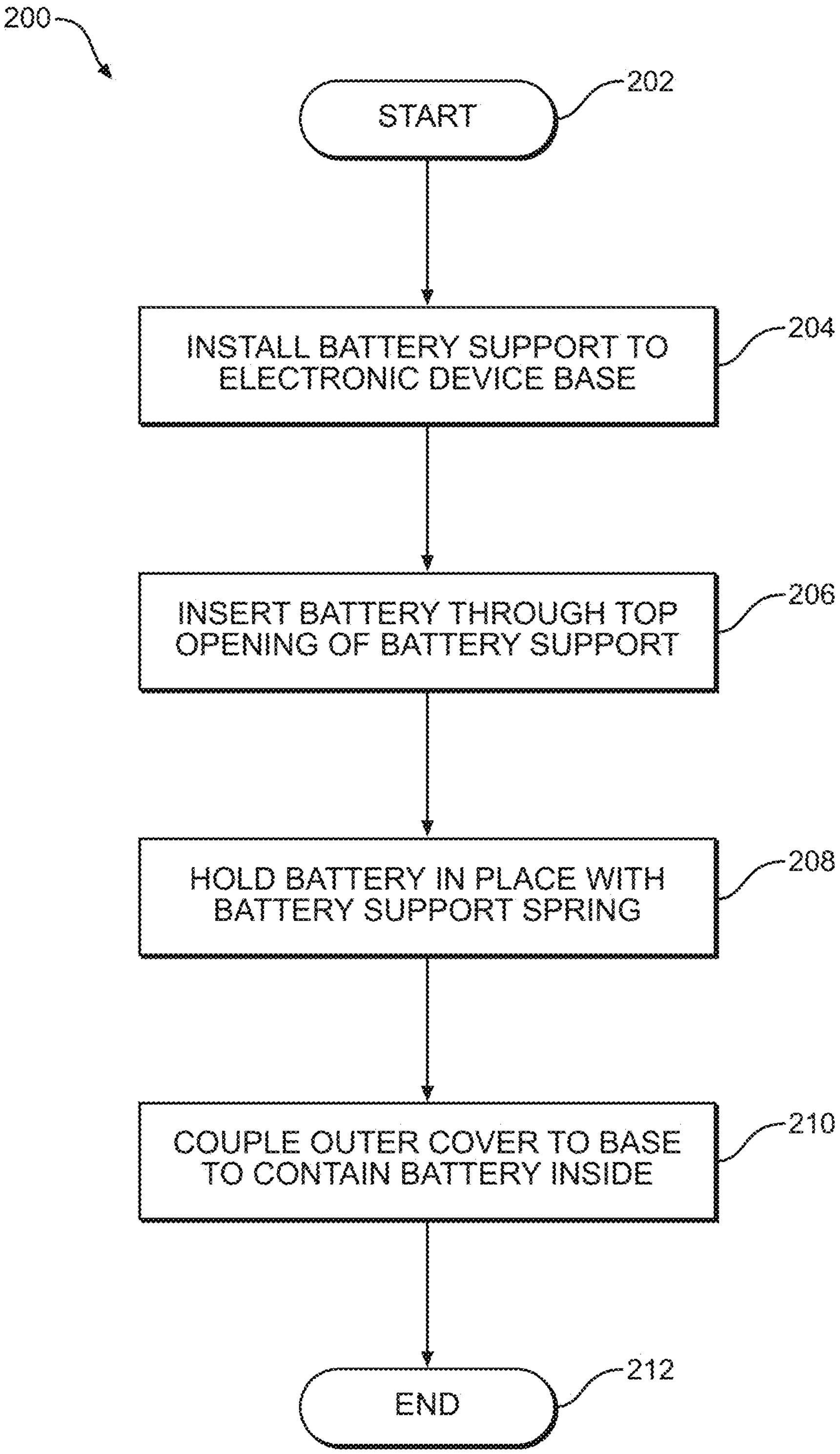
FIG. 2 illustrates a flowchart of an example summary method of using a battery within an electronic device according to one embodiment of the present disclosure.

Moving next to FIG. 2, a flowchart is provided of an example summary method of using a battery within an electronic device. Summary method 200 can represent one broad aspect of various overall methods of using a battery within an electronic device that includes a battery support with an integrated spring element, and it will be understood that various other steps and details of such a broad aspect and overall methods are not provided here for purposes of simplicity. While summary method 200 and other disclosed methods can involve the use of a vibration sensor as the electronic device, for example, it is also contemplated that the disclosed methods can alternatively be used with other sensors or electronic devices.

After a start step 202, a first process step 204 can involve installing a battery support to a base of an electronic device. As noted above, the battery support can include a bottom portion, one or more walls, a top opening, and an integrated spring element formed along a first side of the one or more walls. In some embodiments, installing the battery support can include coupling the battery support to the base by way of one or more screws, bolts, latches, rivets, glue, and/or any other suitable coupling items. In some arrangements, the battery support can be removably installed, such as by using screws. For example, multiple screws can be used by inserting the screws into openings through a bottom portion of the battery support and into corresponding threaded openings built into the electronic device base.

At a following process step 206, a battery can be inserted through a top opening of the battery support. This can involve a removable battery and can include bringing an outer surface of the battery into contact with an inner surface of the integrated spring element. For example, an outer side of the battery can slide past an integrated spring element located along a wall of the battery support during insertion of the battery and can remain in contact with the integrated spring element when the battery is fully inserted. Full insertion of the battery can result in a bottom of the battery contacting and being stopped by the bottom portion of the battery support. Full insertion of the battery can also result in a portion of the battery being located within an inner space of the battery support while another portion of the battery protrudes from the top opening and remains outside of the inner space, as noted above.

The next process step 208 can involve holding the battery in place within the battery support. This can be facilitated at least in part by way of a lateral force exerted on the battery by the integrated spring element. In some arrangements, the integrated spring element can be at least partially deformed by being pushed sideways (i.e., laterally) by the battery due to the dimensions of the battery and the battery support. This can result in a natural biasing spring force pushing back on the battery laterally, with ordinary friction forces then holding the battery in place and preventing it from moving up, down, or sideways within the battery support.

Subsequent process step 210 can involve coupling an outer cover to the base. The outer cover and the base can combine to form an outer housing that contains the battery and battery support therein, as well as various other internal components of the electronic device. Coupling the outer cover to the base can be accomplished by using one or more screws, bolts, or other coupling items that can removably couple the outer cover to the base. For example, screws can be placed through openings at the corners of both the outer cover and the base, with some or all of these openings being threaded to facilitate easy coupling and removal of the outer cover.

Summary method 200 can then end at end step 212. In some arrangements, one or more of the foregoing steps can be performed simultaneously or in a different order. For example, steps 206 and 208 can be performed simultaneously in some arrangements. Not all steps are necessary in all situations, and additional steps and details can be added. Further steps, details, and variations are provided in detailed method 600 set forth below.

FIGS. 3A through 3E illustrate an example battery support configured to hold a battery within an electronic device in rear perspective, front perspective, top side perspective, top plan, and bottom plan views respectively. Battery support 160 can include a single polymeric injection molded integrally formed part with a built-in spring that can firmly hold a battery cell in place for at least 60 G of mechanical vibration forces while still making the installation, removal, and replacement of the battery with another identical or similar battery a relatively easy process. As will be readily appreciated from various drawings and descriptions herein, battery replacement can simply involve removing the outer cover from the base, pulling the battery out of the battery support, inserting a replacement battery into the battery support, and coupling the outer cover back onto the base. Electrically disconnecting the old battery and electrically connecting the replacement battery can also be part of a battery replacement process.

In various embodiments, battery support 160 can be configured to withstand a harsh environment that includes high vibrations for at least five years without fatigue or creep failure. While known battery supporting structures typically include multiple parts to hold a battery in place and to dampen or mitigate ongoing mechanical vibrations, among other functions, battery support 160 can perform all such necessary functions as a single component. This can be accomplished by way of a continuous wall 162 that surrounds the battery, the unique integrated spring element 164 formed in a first side 162*a* of the wall, and/or the battery support material, among other features and factors. Battery support 160 can be an integrally formed part that is made by injection molding a suitable polymeric material. This material can be sufficiently rigid to provide adequate support but can also be flexible enough to result in adequate deformation and spring back functionality of the integrated spring element. In some arrangements, battery support 160 can be formed from polyether ether ketone ("PEEK"), which is a high-performance, heat-resistant thermoplastic polymer having high mechanical strength, thermal stability, and chemical resistance, as will be readily appreciated. Other materials are also possible.

As noted above, battery support 160 can have one or more walls 162 that form a continuous outer circumference around the battery support between bottom portion 161 and top opening 163. This can be considered a single continuous sidewall in some arrangements, rather than multiple separate walls or bracing items on multiple sides of the battery as previously done in known battery support arrangements. Continuous wall 162 can include first side 162*a*, second side 162*b*, third side 162*c*, and one or more other sides. These wall sides can also be considered wall regions, such as where the continuous wall has an irregular shape as shown or where no distinctive sides are apparent. Integrated spring element 164 can be integrally formed in first side 162*a*, a printed circuit board (not shown) can be coupled to second side 162*b*, and ejection opening 167 can be formed along a bottom of third side 162*c*. In some arrangements, one or more of these and/or other wall features could be included along the same wall side or region as may be desired for a given design.

Integrated spring element 164 can be arranged vertically and can include a central bulge or graduated protrusion 165 along its inner surface that extends into the inner space of battery support 160. Protrusion 165 can be located on wall first side 162*a* about halfway between bottom portion 161 and top opening 163. Protrusion 165 can be configured to contact an outer surface of the battery and to deform by being pushed outward when the battery is inserted into the inner space of battery support 160 and pushes against the graduated protrusion. Protrusion 165 can be graduated to minimize the impact of a battery initially contacting and sliding along the protrusion, and to avoid or minimize increased localized stresses within the battery support material that can lead to earlier stress or cycle failure. In some arrangements, the surface area on a graduated protrusion 165 that contacts an inserted battery can form an oval shape. Integrated spring element 164 can also include vertically oriented openings 166 through wall 162 along left and right sides of protrusion 165, with these vertically oriented openings being configured to facilitate greater deformation flexibility of the integrated spring element.

It will be readily appreciated that the lateral force provided by integrated spring element 164 needs opposing lateral force(s) to be effective in holding a battery in place within battery support 160. Accordingly, one or more ribs 168 or other suitable protrusions can be formed in one or more walls 162 or wall regions opposite integrated spring element 164 to provide lateral force(s) that oppose the lateral force of the integrated spring element. While two ribs 168 are shown in the illustrative example provided, it will be understood that more or fewer ribs can be used to accomplish the same function. Ribs 168 can be configured to provide opposing points of contact and opposing lateral forces against a battery when integrated spring element 164 provides its lateral force against the battery. In some arrangements, ribs 168 can be symmetrical to each other, can be vertically oriented, and can be formed in other sides of one or more walls 162 opposite first side 162*a* where integrated spring element 164 is formed. Each rib 168 can extend vertically the full height of its respective wall side or portion from bottom portion 161 to top opening 163. Other rib or opposing points of contact arrangements are also possible.

Figure 3A:
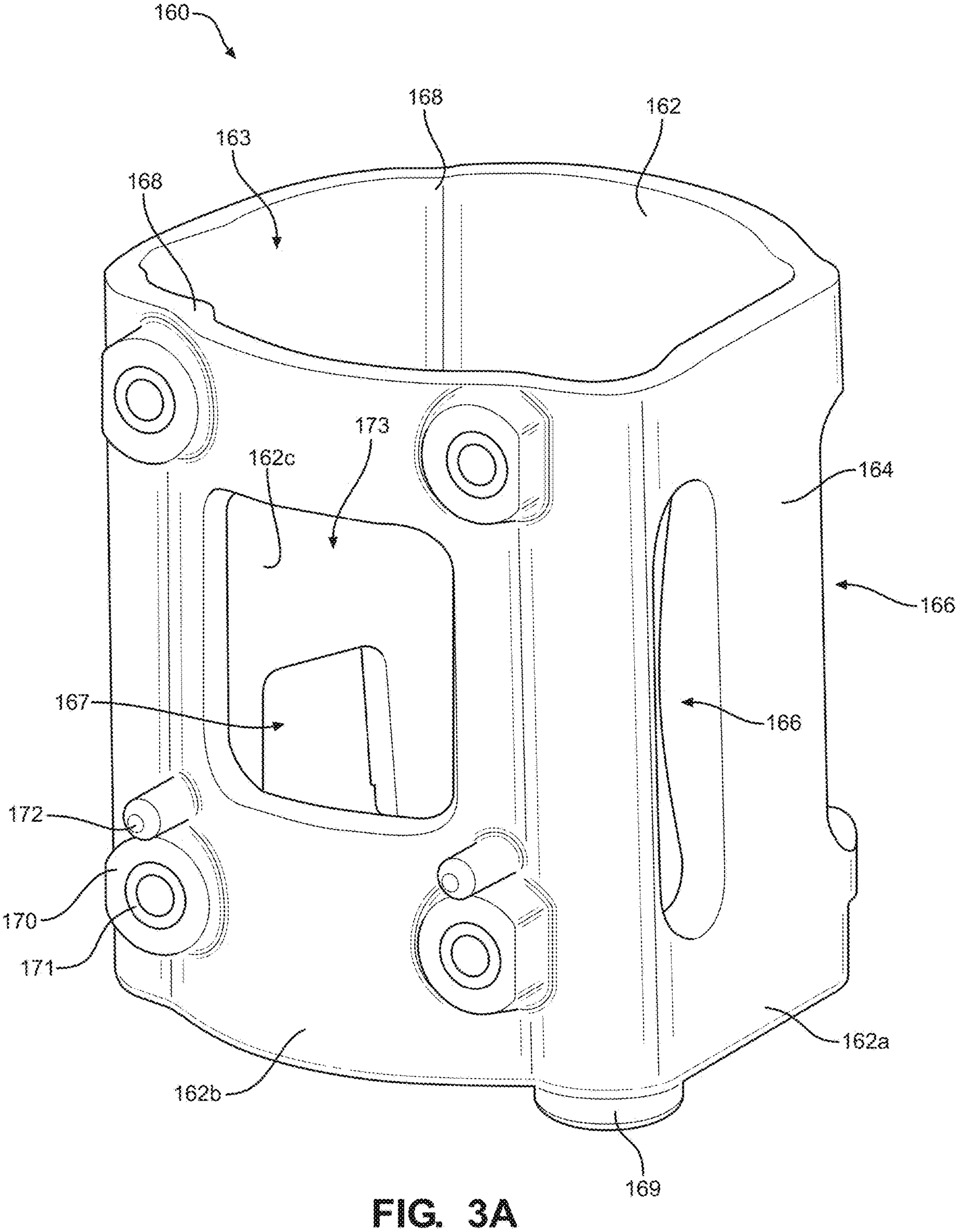
FIG. 3A illustrates in rear perspective view an example battery support configured to hold a battery within an electronic device according to one embodiment of the present disclosure.
Figure 3B:
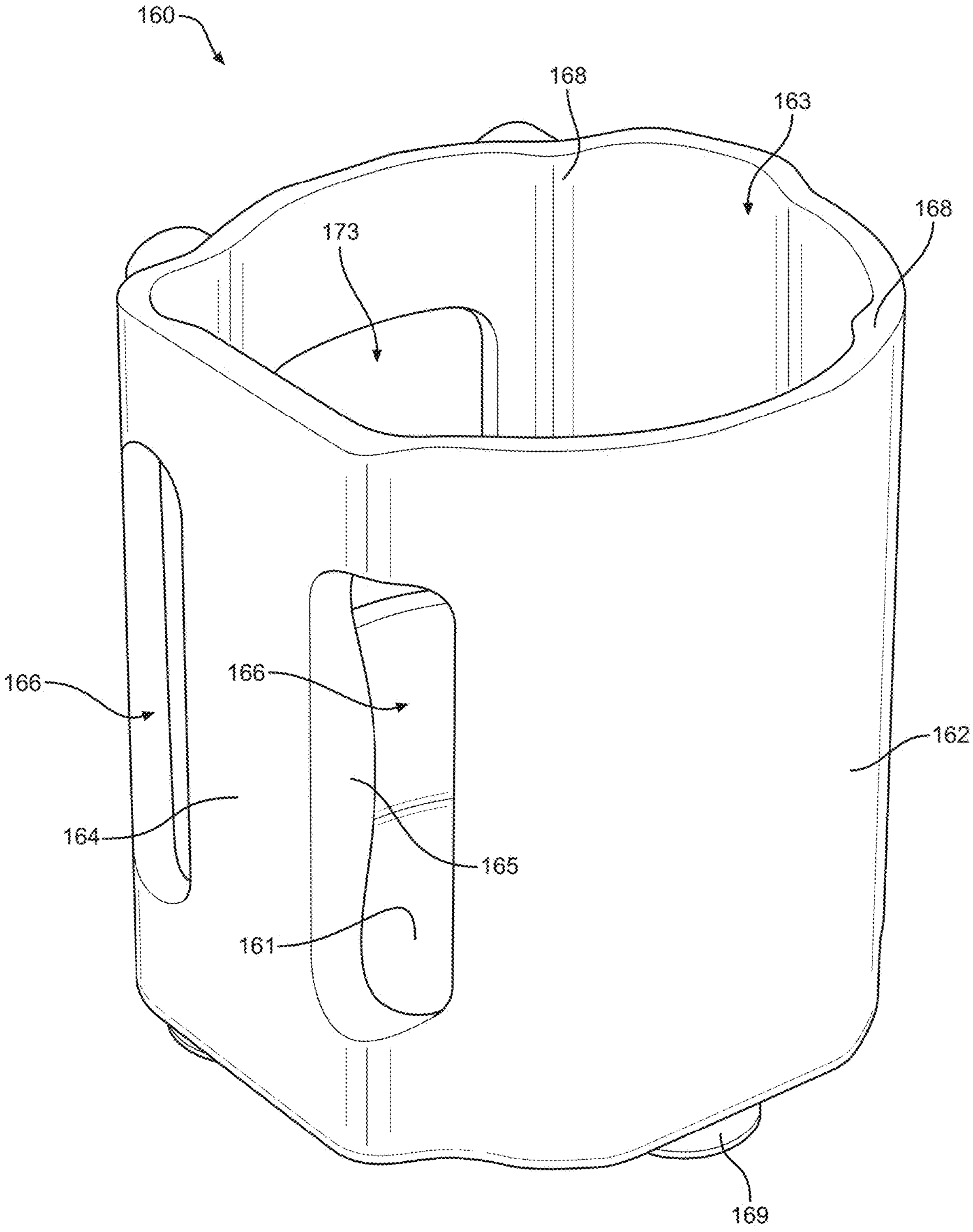
FIG. 3B illustrates in front perspective view the battery support of FIG. 3A according to one embodiment of the present disclosure.
Figure 3C:
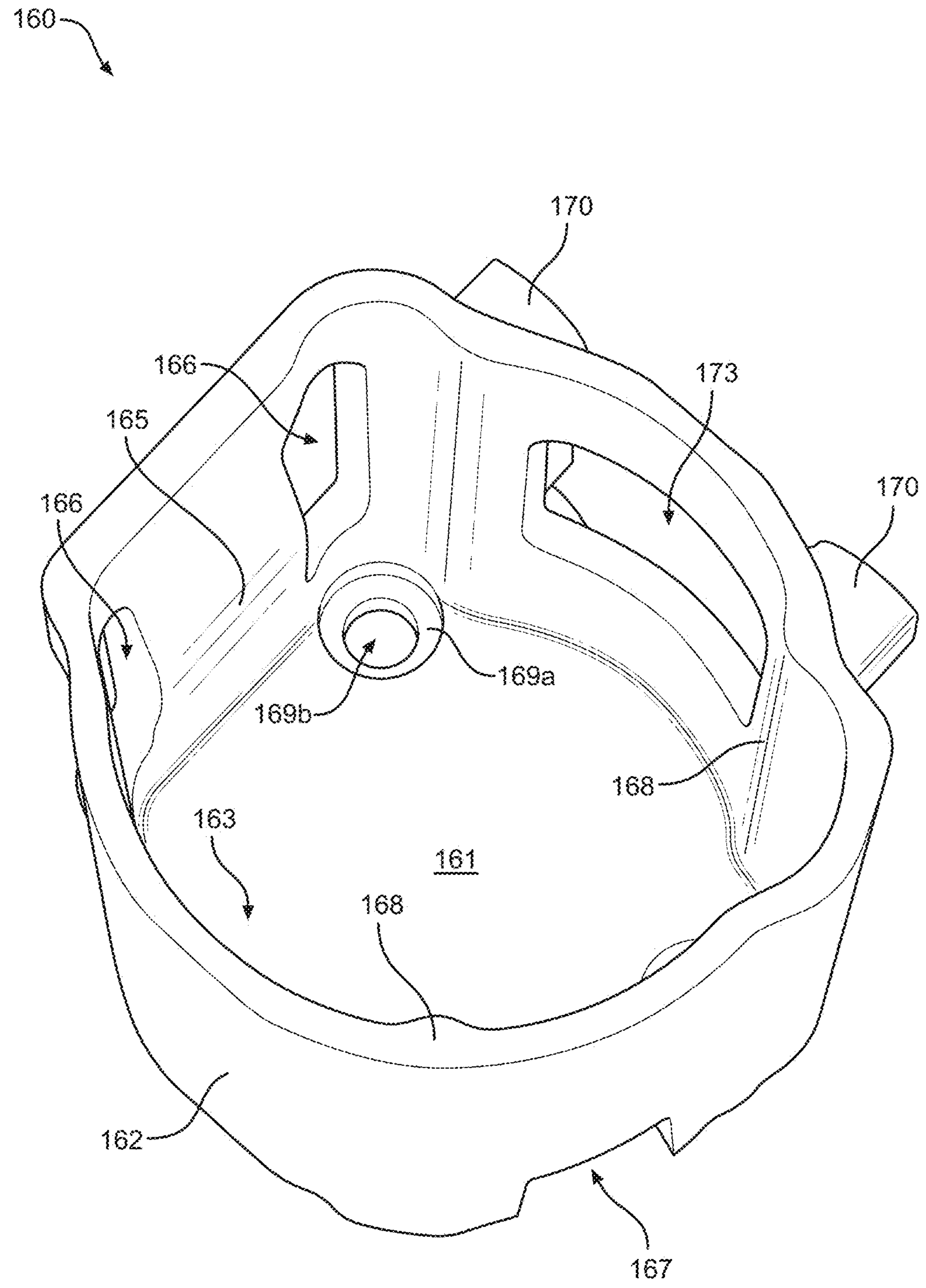
FIG. 3C illustrates in top side perspective view the battery support of FIG. 3A according to one embodiment of the present disclosure.
Figure 3D:
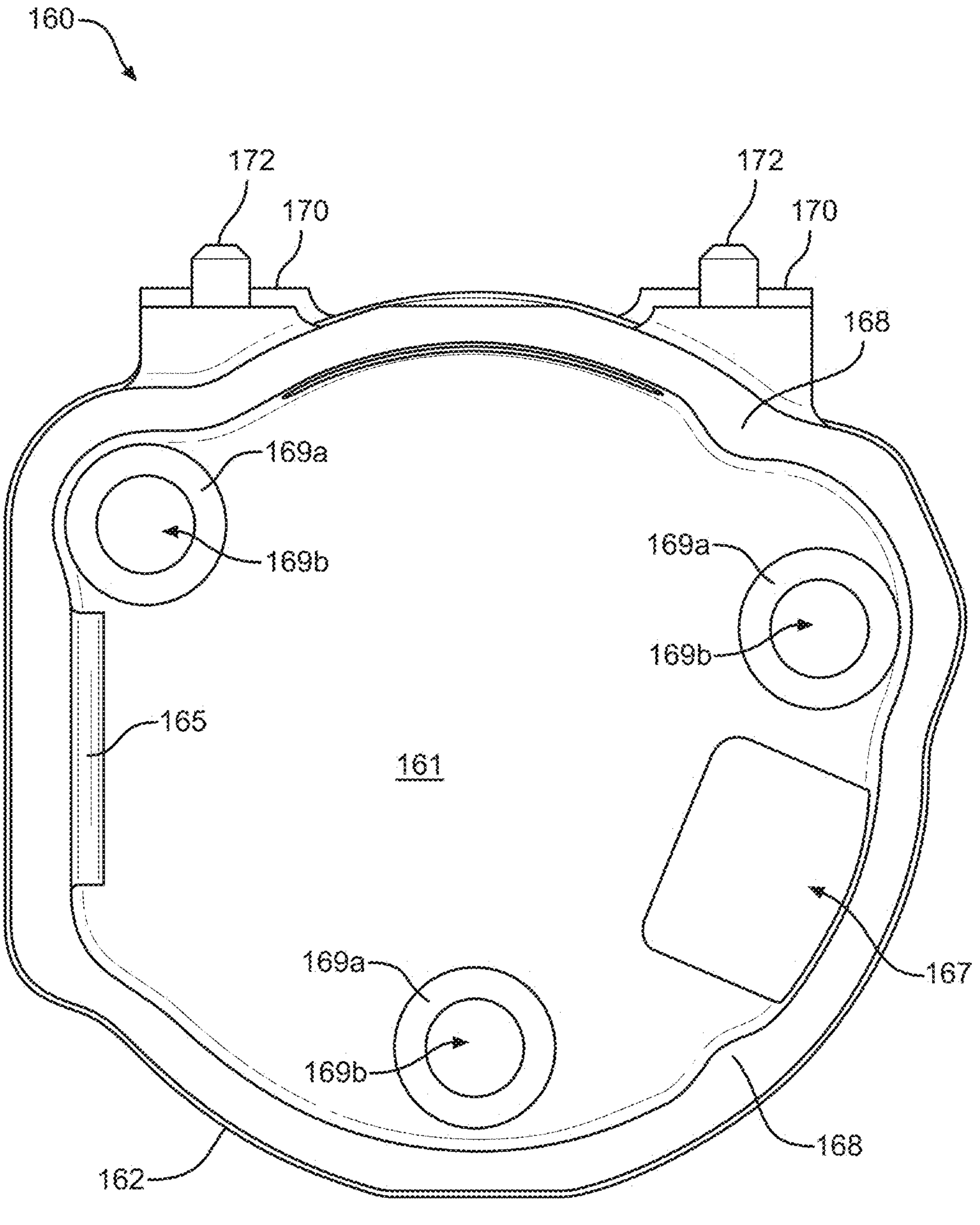
FIG. 3D illustrates in top plan view the battery support of FIG. 3A according to one embodiment of the present disclosure.
Figure 3E:
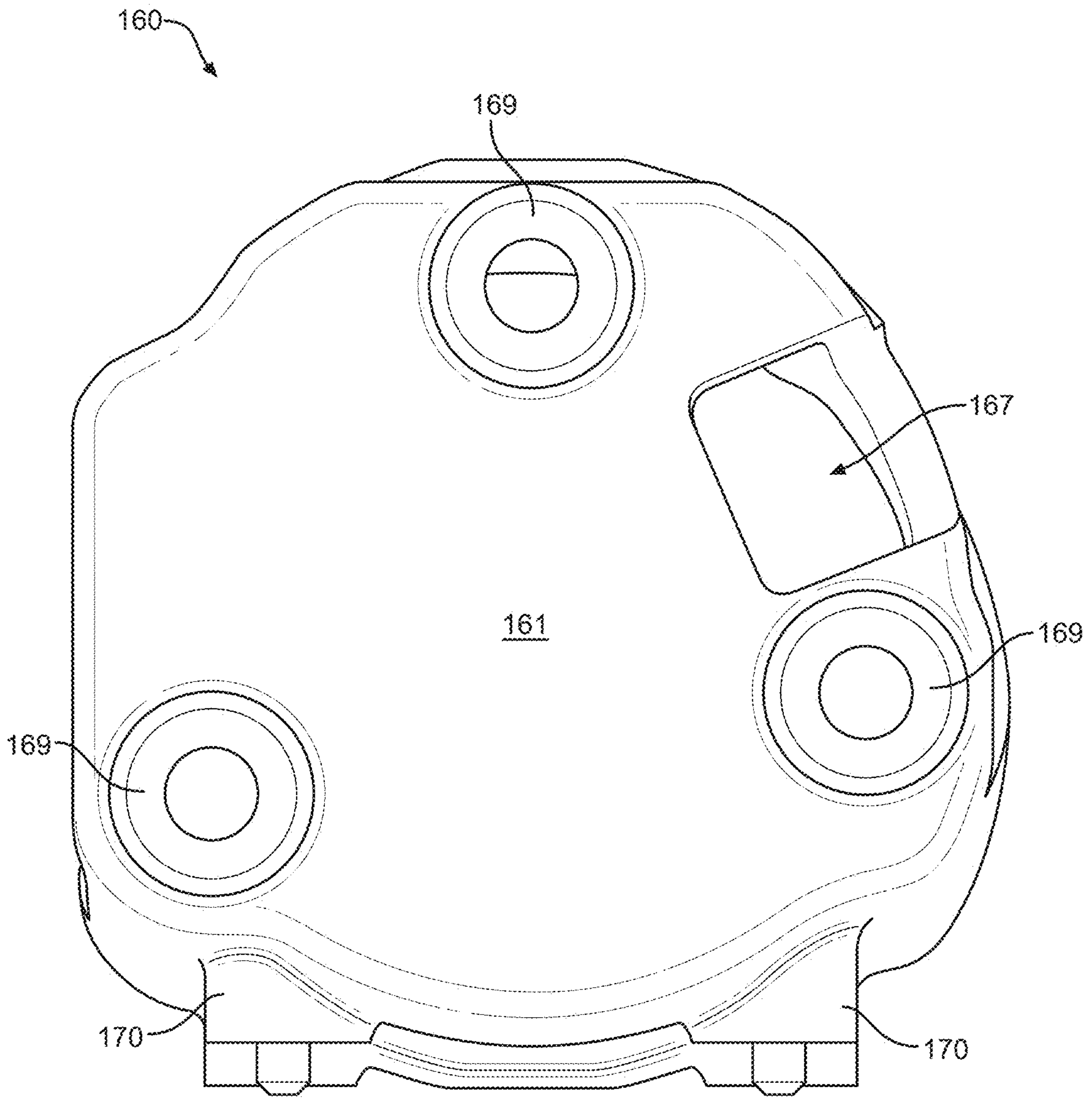
FIG. 3E illustrates in bottom plan view the battery support of FIG. 3A according to one embodiment of the present disclosure.

As can be seen in FIG. 3D in particular, graduated protrusion 165 and ribs 168 can be arranged to form an equilateral triangle that provides three equally distributed points of contact against a battery inserted within battery support 160. Other triangular or effective arrangements can also be used to similarly distribute lateral forces against the battery around its circumference to hold the battery in place. Inserting a battery into the inner space of battery support 160 can result in pushing integrated spring element 164 outward without breaking or damaging the spring element or any other battery support material. Use of vertically extended ribs 168 can provide sufficient surface contact to not only allow for opposing lateral forces but also for an adequate amount of friction to prevent the battery from moving when it is fully installed.

While it can also be possible to have more points of contact around a continuous wall 162 or even have the entire inner surface of battery support be designed to contact an installed battery, use of the disclosed arrangement of protrusion 165 and ribs 168 can allow for greater manufacturing tolerances in the formation of each battery support 160. In practice, dimensional tolerances in injection molding can make it difficult or impossible to make multiple identical or substantially similar battery supports 160 that are each designed to have all or most inner surfaces contact an installed battery, such that the use of vertical ribs 168 or other suitable protrusions alleviate the need for tight dimensional tolerances.

One or more coupling features such as coupling protrusions 169 can be formed in and extend downward from bottom portion 161 to facilitate fastening or otherwise coupling battery support 160 to the base of the electronic device. Each coupling protrusion 169 can include a recessed portion 169*a* that extends with the protrusion and an opening 169*b* configured to allow a screw, bolt, or other suitable coupling item to extend therethrough. Recessed portion 169*a* can be configured such that the head of a screw or bolt can lay beneath the inner surface level of bottom portion 161. The remaining inner surface of bottom portion 161 can be entirely or substantially flat, such that the bottom surface can provide a hard physical stop for the bottom of a fully inserted battery without any interference against the battery with the head of a bolt, screw, or other fastener located in each recessed portion 169*a*.

A printed circuit board coupling arrangement 170, 171, 172 can be formed along second side 162*b* of the one or more walls 162 or wall sides or regions, and this arrangement can be configured to facilitate coupling a printed circuit board for the electronic device directly to battery support 160. The printed circuit board coupling arrangement can include four screw hole protrusions 170 extending from wall second side 162*b*. Each screw hole protrusion 170 can include an overlaid metal thread 171 pressed into or otherwise affixed to an opening in the screw hole protrusion and configured to enhance the reception of a threaded bolt or screw therein to facilitate coupling the printed circuit board at corresponding screw or bolt locations on the printed circuit board. Overlaid metal threads 171 can be the only features of battery support 160 that are not integrally formed with the entire battery support. The printed circuit board coupling arrangement can also include two mounting pins 172 protruding laterally from wall second side 162*b*. Mounting pins 172 can be arranged to correspond to slots or openings in the printed circuit board to also facilitate printed circuit board mounting. More or fewer than four screw hole protrusions 170 and overlaid metal threads 171, more or fewer than two mounting pins 172, and/or different arrangements and locations of these features can alternatively be used for a suitable printed circuit board coupling arrangement.

Other features in battery support 160 can include ejection opening 167 as noted above to facilitate battery removal and printed circuit board window 173 located in wall second side 162*b* between an installed battery and an installed printed circuit board. Printed circuit board window 173 can facilitate greater compactness and increased part tolerances in the overall construction of the entire electronic device, and can also provide a location to pass wires, other electrical connectors, or any other feature or component connecting the battery to the printed circuit board if desired. In some arrangements, one or more outer surfaces along continuous wall 162 can be flat to facilitate gluing or otherwise attaching an antenna to facilitate wireless communications with electronic device. For example, the outer surface of integrated spring element 164 can be flat for such antenna usage.

Figure 4A:
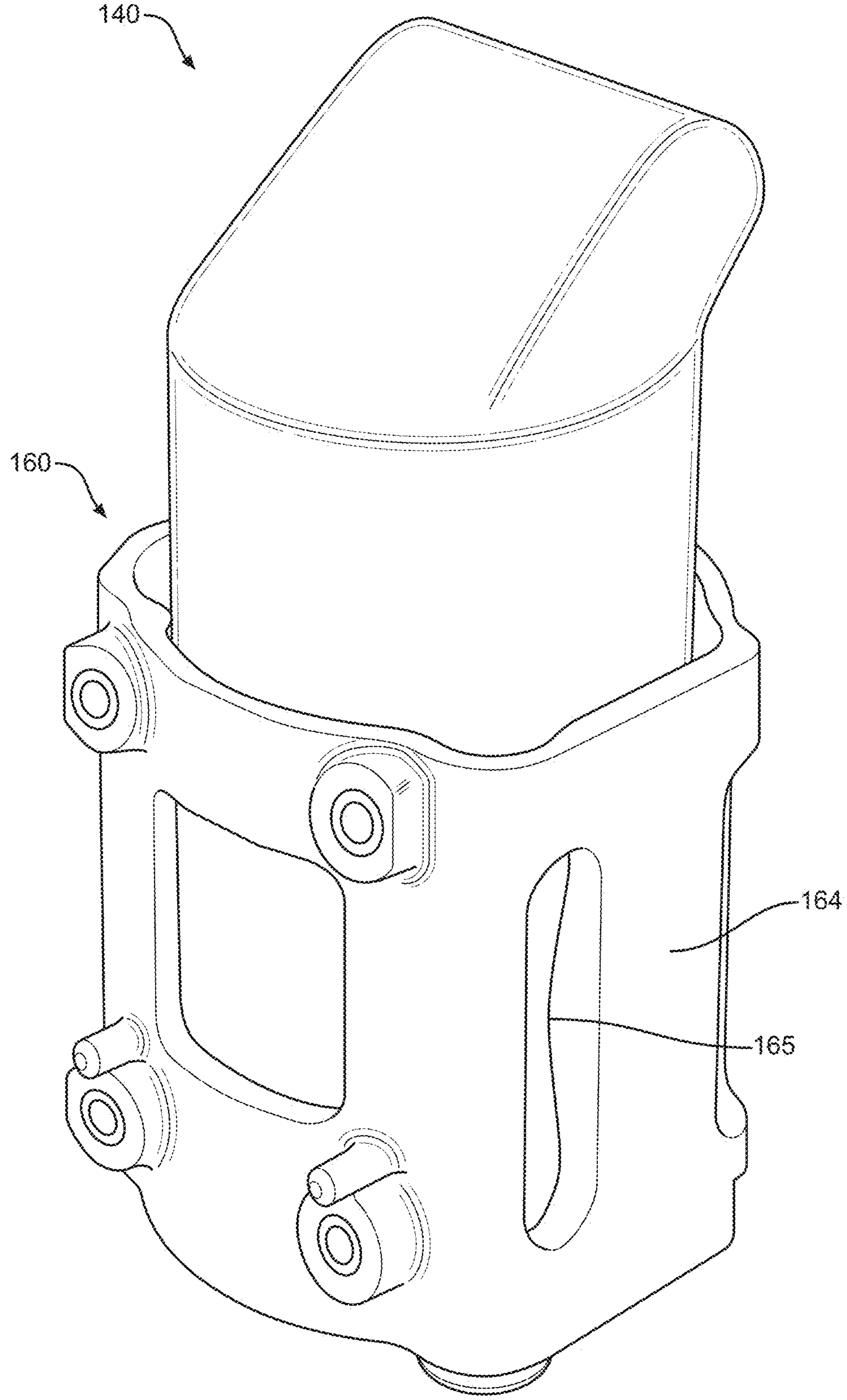
FIG. 4A illustrates in rear perspective view an example battery support with a removable battery held therein according to one embodiment of the present disclosure.
Figure 4B:
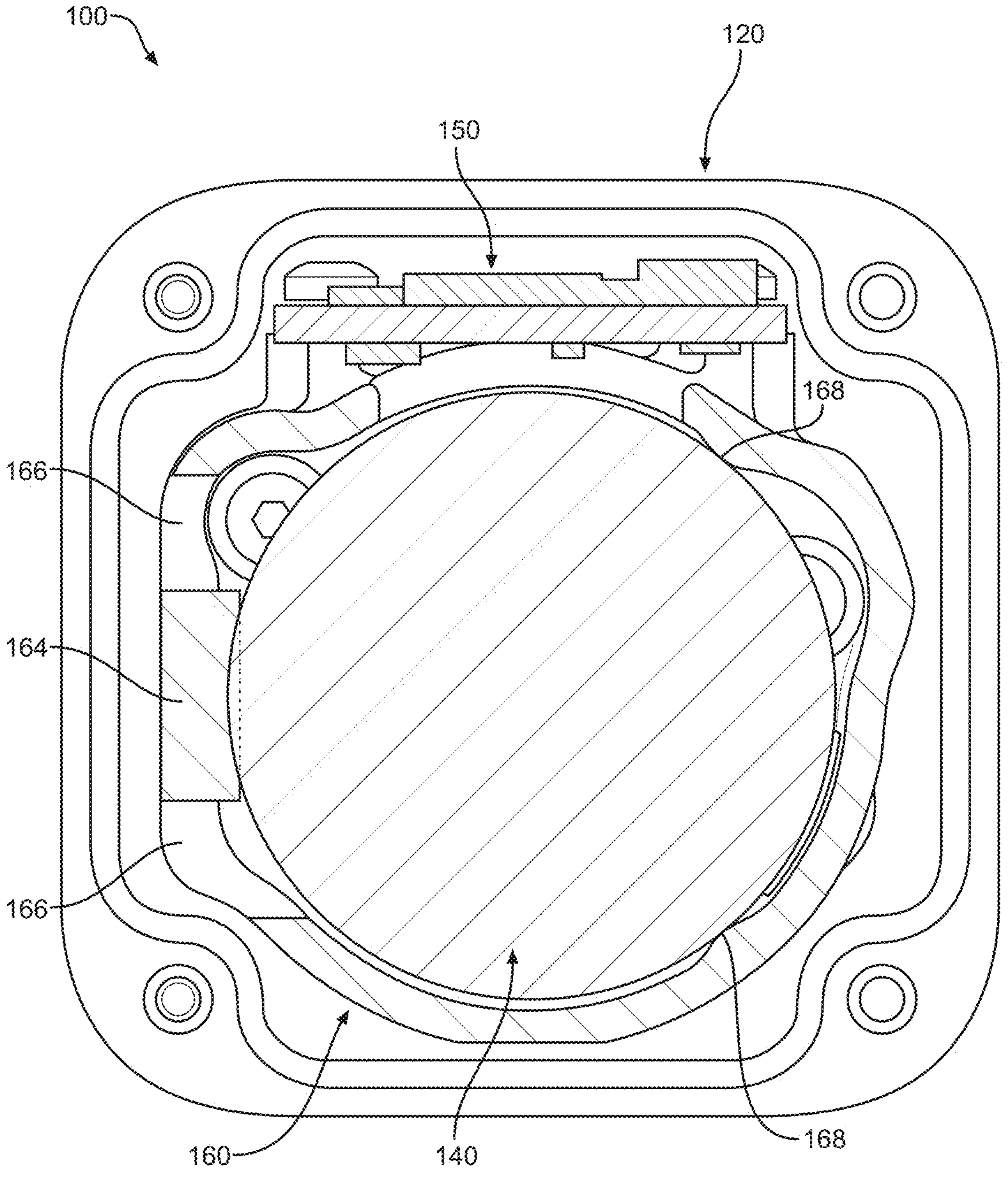
FIG. 4B illustrates in top cross-section view the battery support and removable battery of FIG. 4A according to one embodiment of the present disclosure.
Figure 4C:
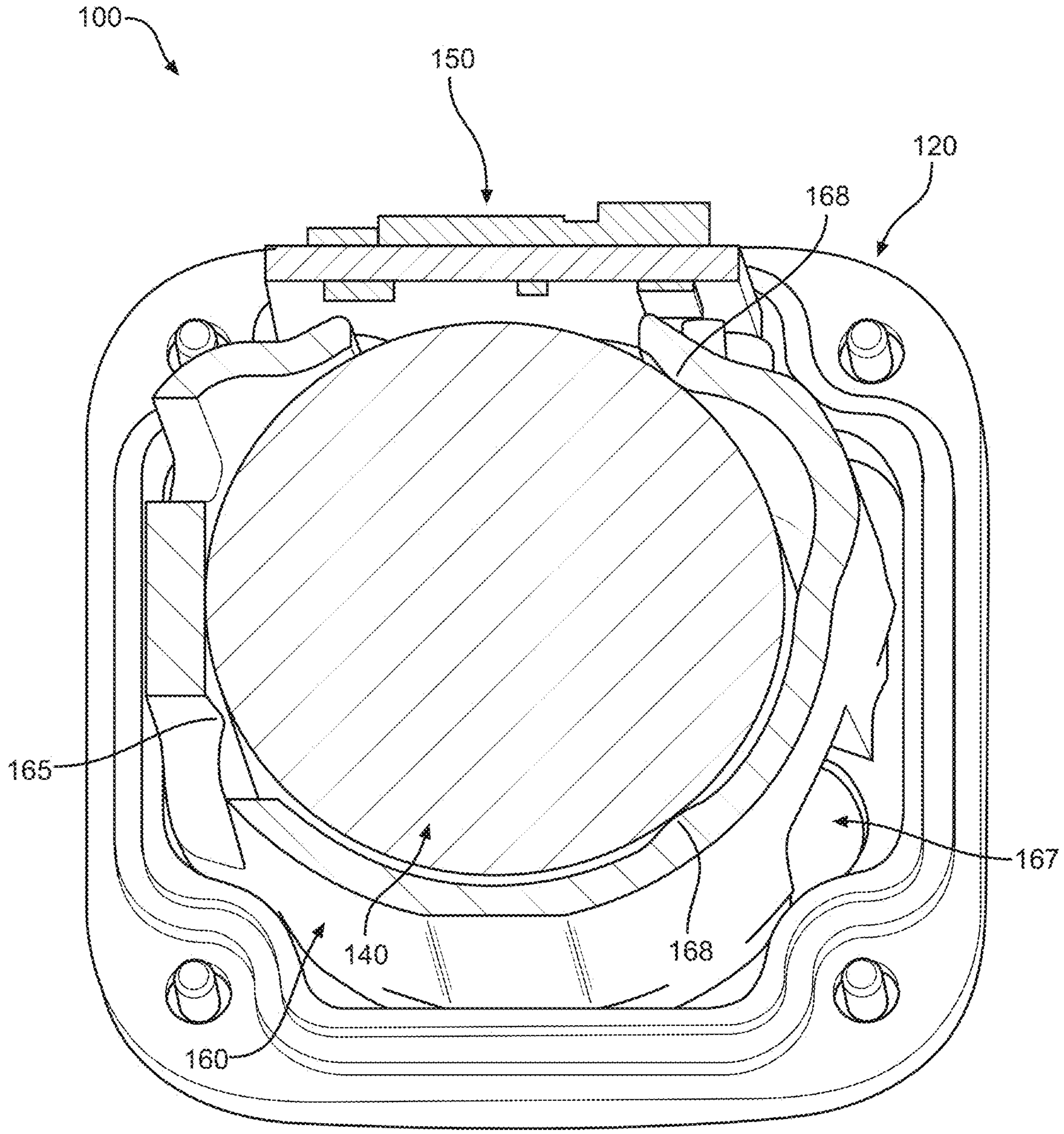
FIG. 4C illustrates in top perspective cross-section view the battery support and removable battery of FIG. 4A according to one embodiment of the present disclosure.
Figure 4D:
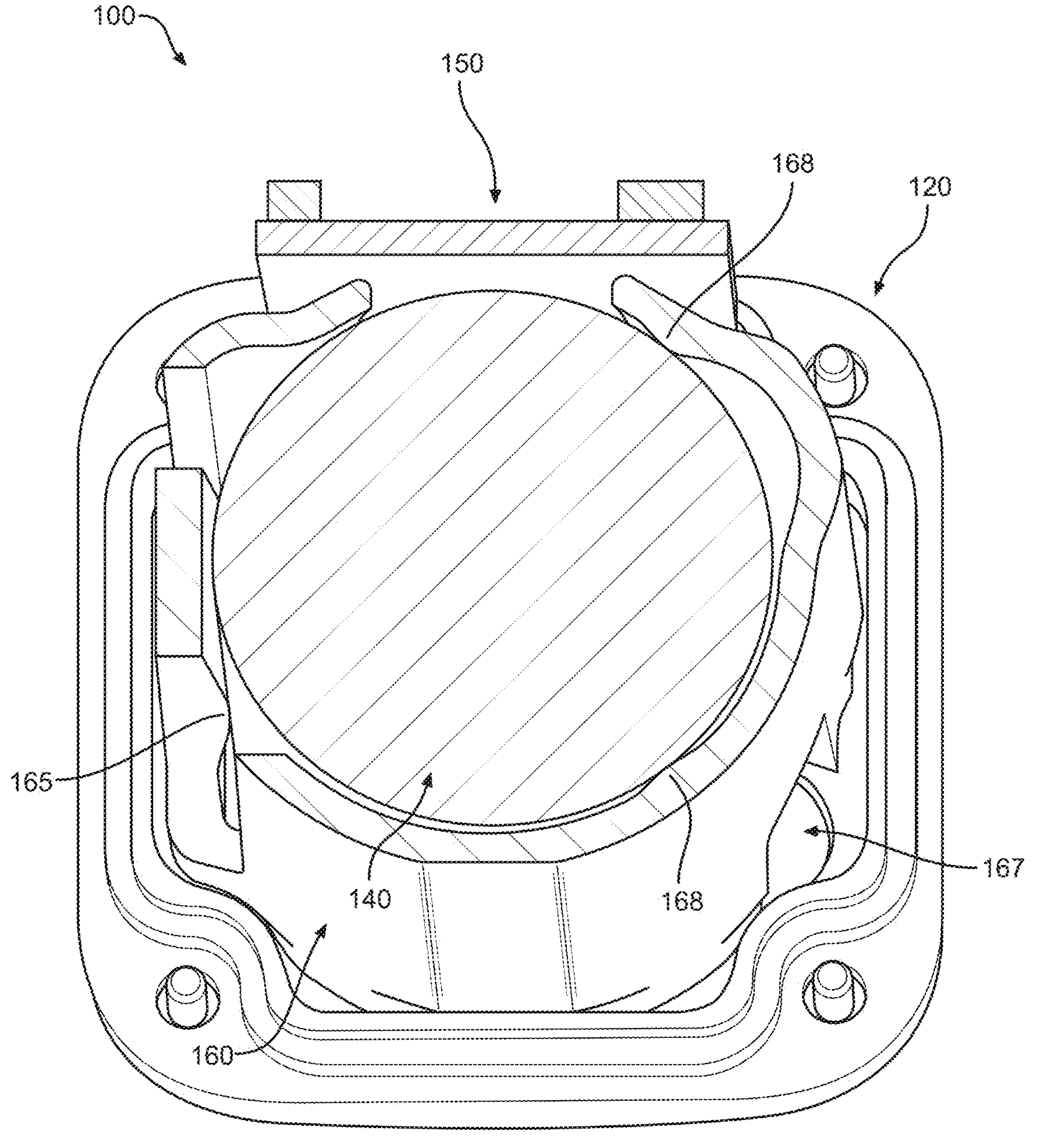
FIG. 4D illustrates in alternative top perspective cross-section view the battery support and removable battery of FIG. 4A according to one embodiment of the present disclosure.

Continuing with FIGS. 4A through 4E, an example battery support with a removable battery fully inserted and held therein is shown in rear perspective, top cross-section, top perspective cross-section, alternative top perspective cross-section, and side cross-section views respectively. FIG. 4A depicts only battery 140 and battery support 160, while FIGS. 4B through 4D add a base 120 and printed circuit board 150 for an electronic device 100 and FIG. 4E adds the remainder of the electronic device. As noted above, installing battery 140 into battery support 160 can involve inserting the battery through a top opening of the battery support and pushing the battery all the way in such that a portion of the battery is held within an inner space of the battery support while another portion of the battery remains outside of the inner space. Installing battery 140 all the way into battery support 160 can involve pushing the battery until the bottom of the battery reaches a hard mechanical stop against the inner surface of battery bottom portion 161, which can be substantially flat. Installing or pushing in battery 140 can require about 20 kg of manual force. In some arrangements, a button, lever, or other indicator can be used to indicate when battery 140 is fully installed within battery support 160.

Ejection opening 167 can facilitate battery removal in some situations by allowing a user to insert a probe, bar, or other suitable tool into the ejection opening to push up against the bottom of a fully installed battery. Because about 20 kg of manual force can be needed to install or remove battery 140 from battery support 160, which can be due to the amount of friction that is generated by lateral forces to the battery at integrated spring element 164 and vertical ribs 168, it may be difficult to pull the battery out from its top region alone. In some situations, it can require up to 200 N of force to lever battery 140 upward from its bottom. Accordingly, a probe or other tool can be inserted at ejection opening 167 to facilitate this force and battery removal.

Figure 4E:
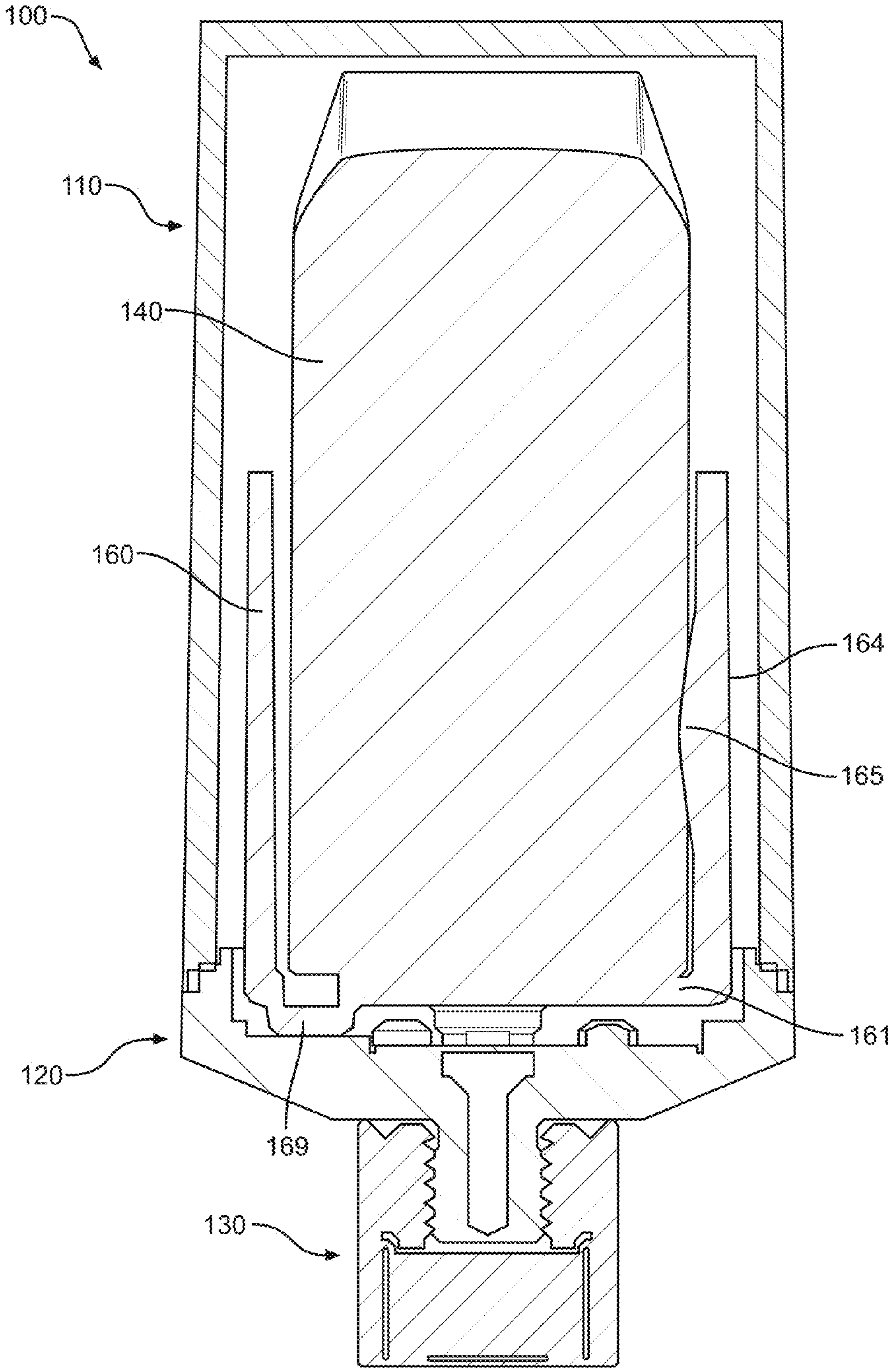
FIG. 4E illustrates in side cross-section view a fully assembled electronic device with the battery support and removable battery of FIG. 4A installed according to one embodiment of the present disclosure.

As shown in the various views of FIGS. 4A through 4E, battery 140 can be held in place within battery support 160 by lateral forces into the exterior of the battery from integrated spring element 164 and vertical ribs 168. In particular, integrated spring element 164 can include protrusion 165 along an inner surface thereof that extends into the inner space of battery support 160 to contact battery 140, while each vertical rib 168 can also extend into the inner space of the battery support to contact the battery. Again, these features can provide all contact with battery 140 from battery support 160, such that the remaining inner surfaces along one or more walls 162 do not ordinarily contact the battery. As will be readily appreciated, contact from battery 160 against graduated protrusion 165 results in lateral force that can push integrated spring element 164 slightly outward. As can be seen in FIG. 4E in particular, however, such slight outward pushing or bowing still does not result in spring element 164 or any portion of battery support 160 contacting outer cover 110 when electronic device is fully assembled.

Figure 5A:
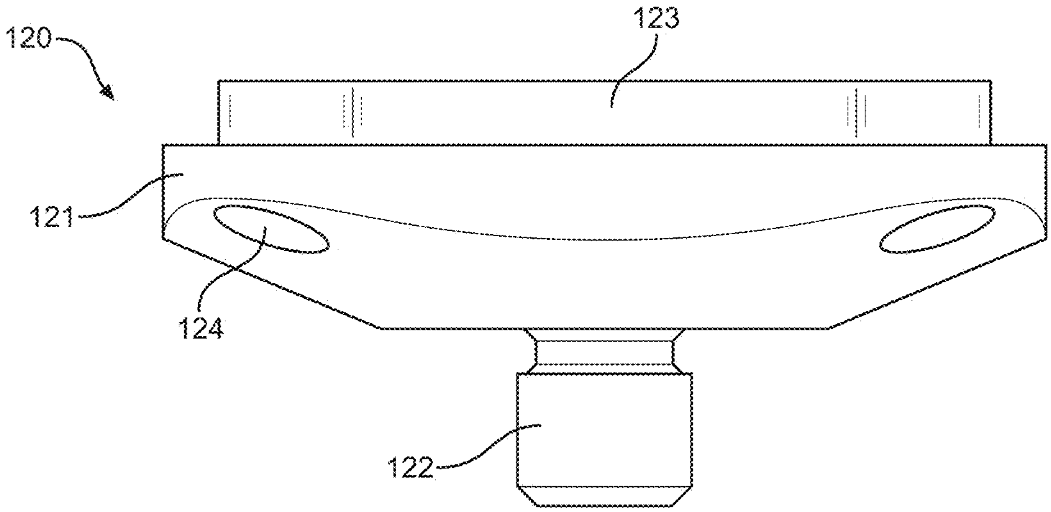
FIG. 5A illustrates in side elevation view an example base for an electronic device according to one embodiment of the present disclosure.
Figure 5B:
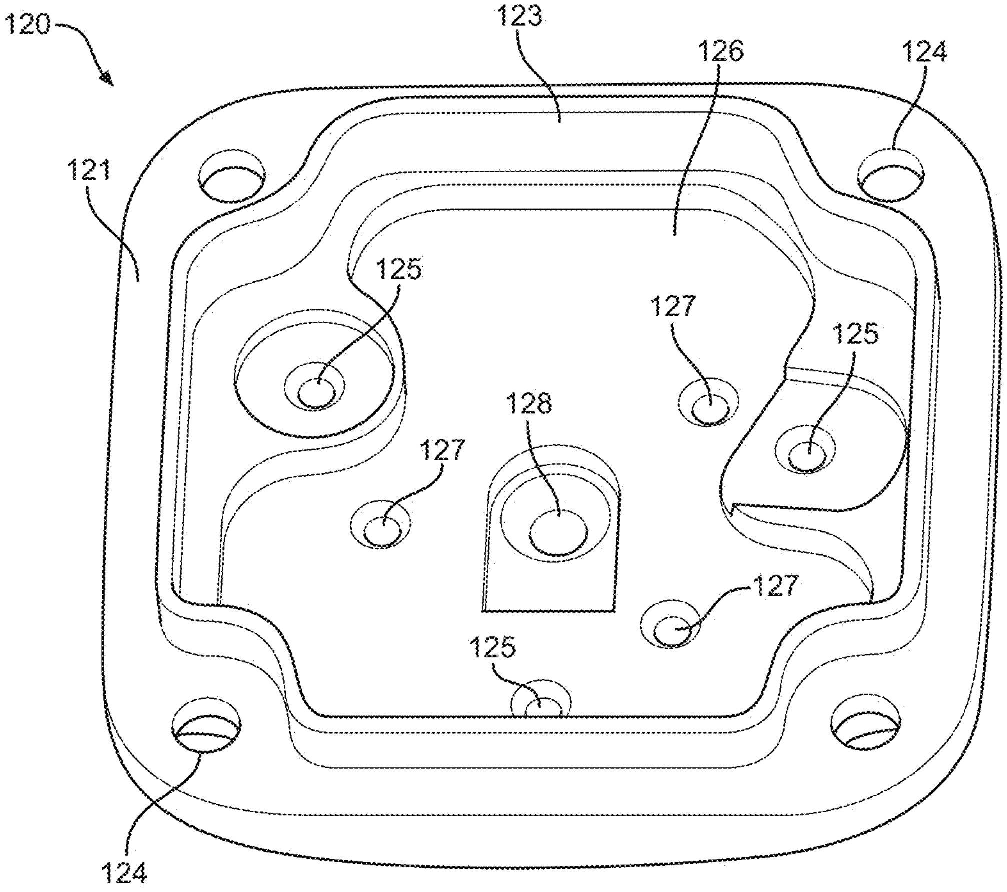
FIG. 5B illustrates in top perspective view the base of FIG. 5A according to one embodiment of the present disclosure.

Transitioning next to FIGS. 5A through 5D, various additional features of electronic device 100 will now be shown and described. FIGS. 5A and 5B illustrate an example base for an electronic device in side elevation and top perspective views respectively. Base 120 can include floor 121, threaded protrusion 122, raised wall 123, top cover coupling holes 124, battery support coupling holes 125, floor recess 126, flexible circuit coupling holes 127, and threaded protrusion upper opening 128, among other possible features. Floor 121 can be arranged to be substantially horizontal when the respective electronic device is in an upright position. Threaded protrusion 122 can extend downward from a bottom surface of floor 121 and can be configured to facilitate coupling the respective electronic device with another device, such as an industrial motor. Raised wall 123 can be configured to surround a lower region of a battery support when installed and to provide structural rigidity for the overall electronic device. Top cover coupling holes 124 can be located at the four corners of floor 121 outside raised wall 123 and can be configured to facilitate coupling base 120 with an outer cover of the electronic device.

Battery support coupling holes 125 can be threaded openings into a top surface of floor 121 and can be configured to receive screws or other coupling items to fasten or otherwise couple a battery support of the electronic device to base 120. Battery support coupling holes 125 can be formed within a locally recessed region that is configured to match and accept coupling protrusions of a battery support (as shown and described as item 169 above). Floor recess 126 can be formed into the top surface of floor 121 at a depth that is lower than the depth of battery support coupling holes 125 such that a cavity or space is formed by the floor recess between the top surface of the floor and the bottom surface of a battery support when the battery support is installed to base 120. Flexible circuit coupling holes 127 can be threaded openings formed within floor recess 126 and can be configured to receive screws or other coupling items to fasten or otherwise couple a flexible circuit within the floor recess beneath an installed battery support.

Figure 5C:
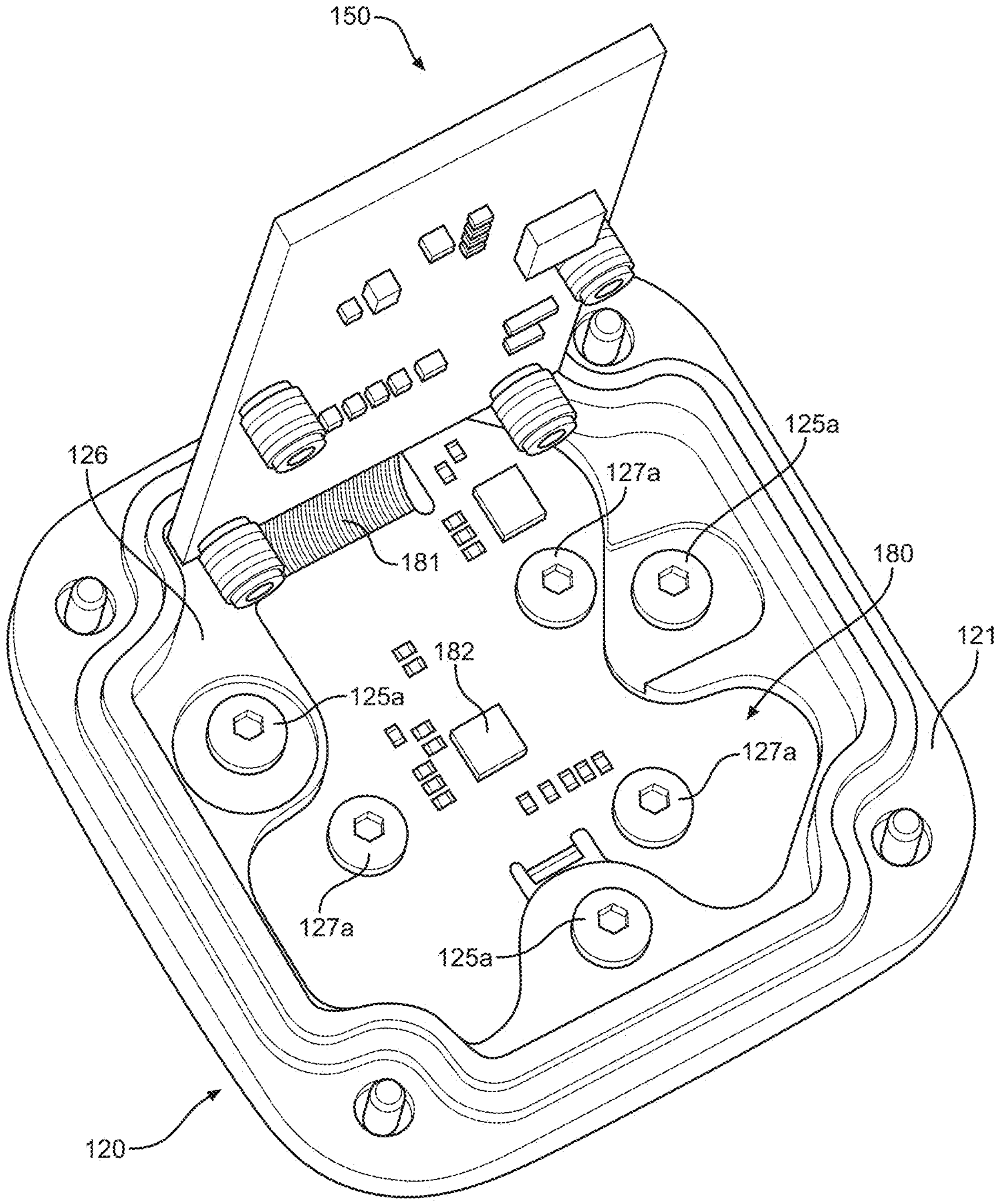
FIG. 5C illustrates in top perspective view the base of FIG. 5A with various electronic components in place according to one embodiment of the present disclosure.

Continuing with FIG. 5C, the base of FIG. 5A with various electronic components in place is shown in top perspective view. Although a battery support is not shown for purposes of illustration, various items are shown as if a battery support is installed and in place. When installed, the battery support can be coupled to base 120 by screws 125*a* that can extend through coupling protrusions of the battery support (as shown and described as item 169 above) into battery support coupling holes (as shown and described as item 125 above). As shown, printed circuit board 150 can be arranged vertically above floor 121 of base 120, and this printed circuit board can be coupled to a wall of the battery support as detailed above.

Flexible circuit 180 can be installed within floor recess 126 such that it is between the upper surface of floor 121 and beneath the bottom of the battery support. Flexible circuit 180 can be coupled to base 120 by screws 127*a* that can extend through the flexible circuit and into flexible circuit coupling holes (as shown and described as item 127 above). Flexible circuit 180 can include various electronic components distributed thereon and can be coupled to various electronic components on printed circuit board 150 by way of flex connector 181. A variety of electronic and other components can be included on or coupled to flexible circuit 180, such as one or more processors, storage components, wireless communication items, piezoelectric elements, and the like, as will be readily appreciated.

In some arrangements, such as where the electronic device is a vibration sensor, for example, flexible circuit 180 can include accelerometer 182 as one of its electronic components. Unlike previously known vibration sensors where accelerometers tend to be located on a printed circuit board toward an edge or other nonoptimal off-center location of the device due to battery support and dampening arrangements and internal space constraints, accelerometer 182 can be more advantageously located, as shown. In particular, accelerometer 182 can be located on flexible circuit 180 such that it is between the bottom portion of the battery support and a bottom of the outer housing along a central longitudinal axis of the vibration sensor or other electronic device. As shown, this location for accelerometer 182 can be just above threaded protrusion 122 and threaded protrusion upper opening 128, which is where vibrations are initially transmitted into the vibration sensor or other electronic device. This central location proximate where vibrations enter the electronic device can be optimal for accelerometer performance in measuring the incoming vibrations.

Figure 5D:
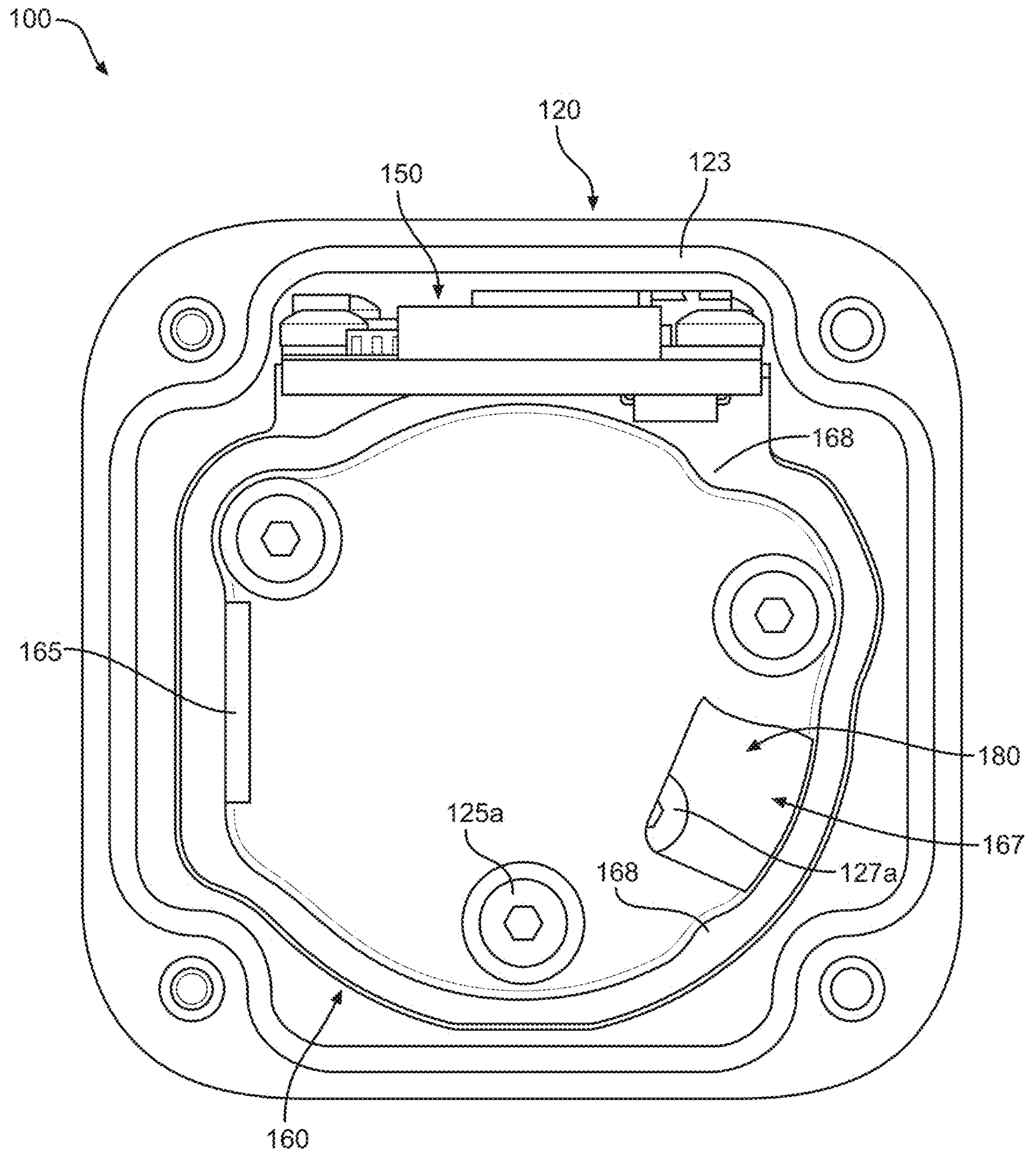
FIG. 5D illustrates in top plan view the base of FIG. 5A with a battery support and various electronic components installed according to one embodiment of the present disclosure.

FIG. 5D illustrates in top plan view the base of FIG. 5A with a battery support and various electronic components installed. As shown, FIG. 5D can correspond to FIG. 1D in that it shows the entire electronic device 100 except for the outer cover and battery. This can reflect a stage in an installation or removal process where battery support 160 is installed to base 120 but the battery and the outer cover are removed or not yet installed. This top plan view of mostly assembled electronic device 100 provides further perspective on various device components and features, such as a bottom portion of ejection opening 167, which reveals a portion of flexible circuit 180 and screw 127*a* located beneath bottom portion 161 of battery support 160.

Figure 6:
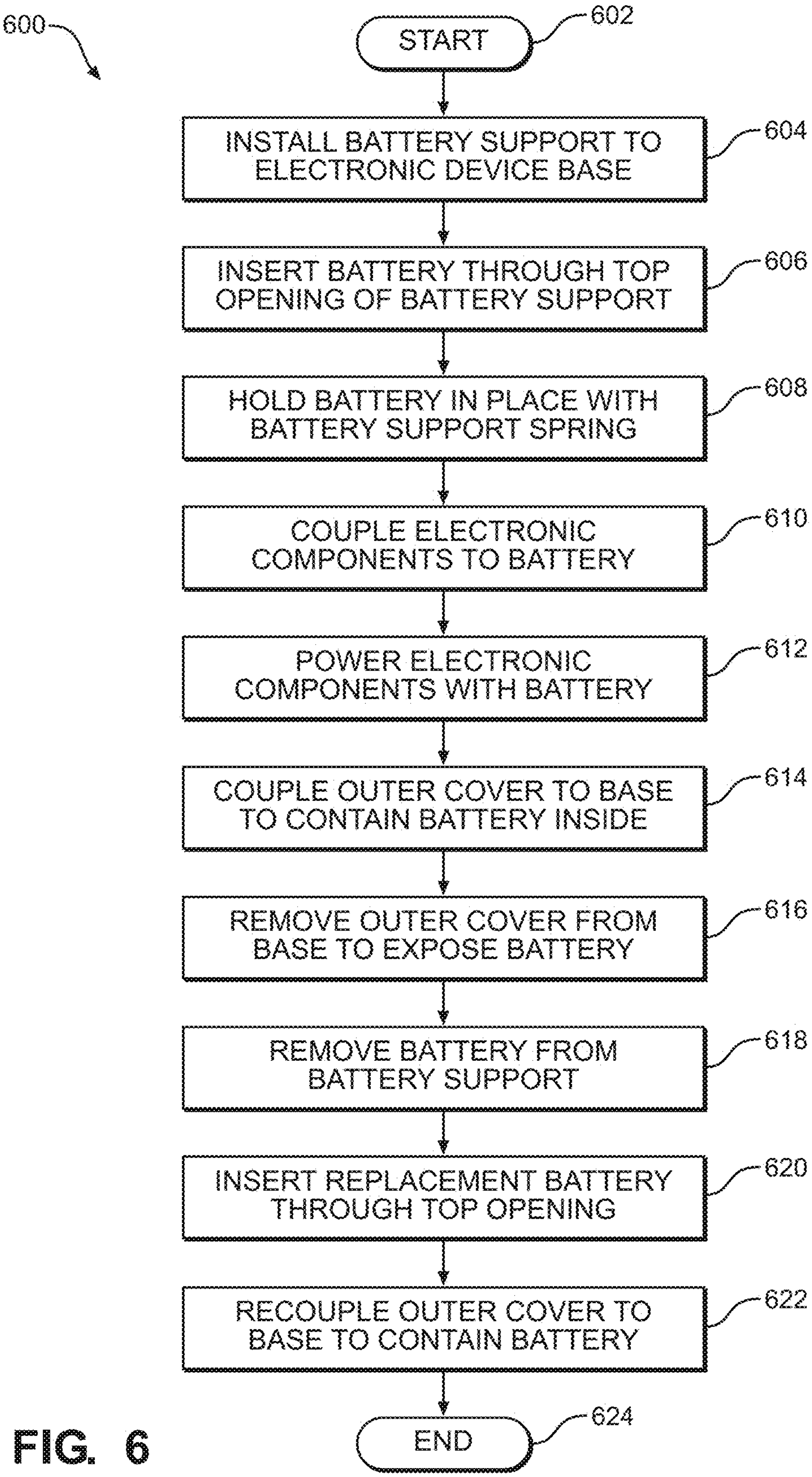
FIG. 6 illustrates a flowchart of an example detailed method of using a battery within an electronic device according to one embodiment of the present disclosure.

Lastly, FIG. 6 illustrates a flowchart of an example detailed method of using a battery within an electronic device. Detailed method 600 can represent one possible way of holding or otherwise using a battery within an electronic device and it will be understood that various other steps, features, and details of such a detailed method are not provided here for purposes of simplicity. Detailed method 600 can include some or all steps and details of summary method 200 above, as will be readily appreciated. While detailed method 600 contemplates using a replaceable battery within a vibration sensor that can be mounted to an industrial motor to monitor vibrations in the motor, for example, it will be readily appreciated that other batteries and electronic devices can alternatively be used.

After a start step 602, a first process step 604 can involve installing a battery support to a base of an electronic device. Step 604 can be identical or substantially similar to step 204 above in some arrangements. The battery support and electronic device base can be those as shown and described above. Again, installing the battery support can include coupling the battery support to the base using suitable coupling items such as screws through protrusions in a bottom portion of the battery support into threaded openings in the base, as detailed above.

At a following process step 606, a battery can be inserted through a top opening of the battery support. Step 606 can be identical or substantially similar to step 206 above in some arrangements. As noted above, this can involve inserting the battery through the top opening such that outer surfaces of the battery contact and slide past an integrated spring element and one or more ribs located along battery support walls. Again, full insertion or installation of the battery can result in a bottom of the battery contacting and being mechanically stopped by the bottom portion of the battery support.

The next process step 608 can involve holding the battery in place within the battery support. Step 608 can be identical or substantially similar to step 208 above, and as such can be facilitated by way of a lateral forces exerted on the battery by a graduated protrusion on an inner surface of the integrated spring element and the one or more ribs, which can be vertically arranged. Again, ordinary friction forces from contact with the integrated spring element and the one or more ribs can serve to hold the battery in place and prevent it from moving up, down, or sideways within the battery support.

At subsequent process step 610, the battery can be electrically coupled to a plurality of electronic components located on the electronic device. Such electronic components can be those that are within the outer housing when the electronic device is fully assembled. This can involve manually coupling a flexible circuit and/or one or more wires or other electrical connectors from ports on the battery to one or more locations on a printed circuit board and/or a flexible circuit located on the electronic device. In some arrangements, the plurality of electronic components can include an accelerometer, such as where the electronic device is a vibration sensor or other device that makes use of an accelerometer.

A following process step 612 can involve powering the plurality of electronic components with the now coupled battery. Such a powering step can be the natural result of electrically coupling the battery to the electronic components. In some arrangements, one or more switches or other suitable powering mechanism can be used to control the flow of power from the battery to one or more of the electronic components as may be desired.

Process step 614 can then involve coupling an outer cover to the base. Step 608 can be identical or substantially similar to step 210 above. The outer cover and the base can combine to form an outer housing that contains all internal components of the electronic device. Coupling the outer cover to the base can be accomplished by using any suitable coupling items, such as screws placed through openings at the corners of both the outer cover and the base.

At a following process step 616, the outer cover can be removed from the base. This can be done in situations where the battery is to be replaced, for example, as well as to perform maintenance or troubleshooting on internal components within the electronic device. Removal of the outer cover can simply involve removing the screws or other coupling items holding the outer cover to the base and then removing the uncoupled outer cover.

The next process step 618 can involve removing the battery from the battery support. This can be done during a battery replacement process, such as where an old battery is expired or weakened and a new battery is desired. Removing the battery can include pulling on an upper portion of the battery to remove it from the battery support. As noted above, removing the battery can also involve inserting a probe or other suitable tool or lever into an ejection opening toward the bottom of the battery support to push the bottom of the battery upward from the bottom portion of the battery support.

At process step 620, a replacement battery can be inserted through the top opening of the battery support. Step 620 can be identical or substantially similar to step 606 above, only with a new or different battery that replaces the old battery. As will be readily appreciated, the replacement battery can be identical or substantially similar to the old battery, only with an improved or sufficient power in comparison. Finally, process step 622 can involve recoupling the outer cover to the base. Step 622 can be identical or substantially similar to step 614 above, and can result in the electronic device being fully assembled after the replacement of the battery.

The method can then end at step 624. For foregoing detailed method 600, it will be appreciated that not all process steps are necessary, and that other process steps may be added in some arrangements. For example, step 604 is unnecessary where an assembled electronic device with a battery support installed already exists. As another example, steps 616 through 622 need not be performed unless a replacement battery is needed. Steps can also be performed in different orders where practical, and some steps can be performed simultaneously. For example, step 610 can be performed prior to step 606 in some arrangements. It will be understood that other process steps may be added, such as forming the battery support, uncoupling the first battery electrically, and coupling the replacement battery electrically, for example. Although known process steps are provided for the various techniques in detailed method 600, it will be appreciated that other similar methods for using a battery in an electronic device involving the disclosed battery support with integrated spring element are also possible.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details but rather is to be defined by the scope of the appended claims.

What is claimed is:

1. A battery support configured to hold a separate battery within a separate electronic device, the battery support comprising:

a bottom portion configured to contact a separate battery when the separate battery is installed within the battery support;

one or more walls coupled to and extending away from the bottom portion, wherein the bottom portion and the one or more walls define an inner space configured to hold at least a portion of the separate battery therein;

a top opening located along a top of the one or more walls opposite the bottom portion, wherein the top opening is configured to facilitate insertion and removal of the separate battery into and from the inner space;

an integrated spring element formed along a first side of the one or more walls, wherein the integrated spring element is configured to deform and to provide a lateral force against a side of the separate battery when the separate battery is installed within the battery support, the lateral force being sufficient to hold the separate battery in place within the battery support, and wherein the integrated spring element includes an inner surface that is also the inner surface of the first side wall and an outer surface that is also the outer surface of the first side wall; and a plurality of ribs separate from any portion of any integrated spring element and located opposite the integrated spring element, wherein the plurality of ribs are configured to provide opposing points of contact and forces against the separate battery when the integrated spring element provides a lateral force against the separate battery.

2. The battery support of claim 1, wherein the separate electronic device is a vibration sensor configured to monitor vibrations of a separate mechanical asset.

3. The battery support of claim 1, wherein the one or more walls form a continuous outer circumference around the battery support between the bottom portion and the top opening.

4. The battery support of claim 1, wherein the bottom portion, the one or more walls, and the integrated spring element are all integrally formed from a polyether ether ketone material.

5. The battery support of claim 1, wherein the integrated spring element is arranged vertically along the first side of the one or more walls.

6. The battery support of claim 1, wherein the integrated spring element includes a graduated protrusion along an inner surface of the first side that extends into the inner space and that is graduated to increase and decrease in a vertical direction.

7. The battery support of claim 6, wherein the graduated protrusion is configured to contact an outer surface of the separate battery and to deform by being pushed outward when the separate battery is inserted into the inner space such that an outer surface of the integrated spring element bows outward.

8. The battery support of claim 6, wherein the integrated spring element further includes vertically oriented openings through the first side of the one or more walls along left and right sides of the graduated protrusion, the vertically oriented openings configured to facilitate greater deformation flexibility of the integrated spring element.

9. The battery support of claim 1, wherein the plurality of ribs are vertically oriented and are formed in multiple other sides of the one or more walls opposite the first side.

10. The battery support of claim 1, further comprising:

a printed circuit board coupling arrangement formed along a second side of the one or more walls separate from the first side, wherein the printed circuit board coupling arrangement is configured to facilitate coupling a separate printed circuit board for the separate electronic device to the battery support.

11. The battery support of claim 1, wherein the bottom portion includes a plurality of coupling features configured to couple the battery support to a separate outer housing of the separate electronic device while the battery support is located within the separate outer housing.

12. The battery support of claim 1, wherein the battery support is configured to hold the separate battery in place within the battery support for a period of at least 5 years and while mechanical vibrations of over 60 G are consistently experienced by the battery support.

13. The battery support of claim 1, wherein the integrated spring element is embedded within the first side wall.

14. The battery support of claim 1, wherein the integrated spring element forms a majority of the first side wall.

15. An electronic device, comprising:

an outer housing defining an internal volume;

a replaceable battery located within the internal volume of the outer housing;

a plurality of electronic components located within the internal volume of the outer housing, wherein the plurality of electronic components are coupled to and powered by the replaceable battery; and a battery support located within the outer housing and holding the replaceable battery, the battery support including a bottom portion, one or more walls, a top opening, an integrated spring element formed along a first side of the one or more walls, and a plurality of ribs separate from any portion of any integrated spring element and located opposite the integrated spring element, wherein the integrated spring element is configured to deform and to provide a lateral force against a side of the replaceable battery when the replaceable battery is installed within the battery support, the lateral force being sufficient to hold the replaceable battery in place within the battery support, wherein the integrated spring element includes an inner surface that is also the inner surface of the first side wall and an outer surface that is also the outer surface of the first side wall, and wherein the plurality of ribs are configured to provide opposing points of contact and forces against the separate battery when the integrated spring element provides a lateral force against the separate battery.

16. The electronic device of claim 15, wherein the electronic device is a vibration sensor configured to monitor vibrations of a separate mechanical asset.

17. The electronic device of claim 16, wherein the vibration sensor includes an accelerometer located between the bottom portion of the battery support and a bottom of the outer housing along a central longitudinal axis of the vibration sensor.

18. The electronic device of claim 15, wherein the outer housing includes an outer cover removably coupled to a base.

19. The electronic device of claim 15, wherein the integrated spring element is arranged vertically along the first side of the one or more walls, includes a graduated protrusion along an inner surface of the first side that contacts and is pushed outward by an outer surface of the replaceable battery, and includes vertically oriented openings through the first side along left and right sides of the graduated protrusion with the vertically oriented openings being configured to facilitate greater deformation flexibility of the graduated spring element.

20. A method of using a battery within an electronic device, the method comprising:

installing a battery support to a base of an electronic device, wherein the battery support includes a bottom portion, one or more walls, a top opening, an integrated spring element formed along a first side of the one or more walls, and a plurality of ribs separate from any portion of any integrated spring element and located opposite the integrated spring element, wherein the integrated spring element includes an inner surface that is also the inner surface of the first side wall and an outer surface that is also the outer surface of the first side wall, and wherein the plurality of ribs are configured to provide opposing points of contact and forces against the separate battery when the integrated spring element provides a lateral force against the separate battery;

inserting a battery through the top opening of the battery support, wherein inserting the battery includes bringing an outer surface of the battery into contact with an inner surface of the integrated spring element;

holding the battery in place within the battery support, wherein holding the battery is facilitated at least in part by way of a lateral force exerted on the battery by the integrated spring element; and coupling an outer cover to the base, wherein the outer cover and the base combine to form an outer housing that contains the battery and battery support therein.

21. The method of claim 20, wherein the electronic device is a vibration sensor, and further comprising the steps of:

coupling the battery electrically to a plurality of electronic components located within the outer housing, wherein the plurality of electronic components include an accelerometer;

powering the plurality of electronic components with the battery;

removing the outer cover from the base;

removing the battery from the battery support;

inserting a replacement battery through the top opening of the battery support; and recoupling the outer cover to the base.

* * * * *